United States Patent
Jeon et al.

(10) Patent No.: US 10,812,425 B2
(45) Date of Patent: Oct. 20, 2020

(54) METHOD AND SYSTEM FOR PROVIDING QUIZ TOGETHER WITH ADVERTISEMENT IN INSTANT MESSAGE SERVICE (IMS) CHAT ROOM

(71) Applicants: Chang Sub Jeon, Goyang-si, Gyeonggi-do (KR); Keun Woo Lee, Goyang-si, Gyeonggi-do (KR)

(72) Inventors: Chang Sub Jeon, Goyang-si (KR); Keun Woo Lee, Goyang-si (KR); Yong Joo Shim, Seoul (KR)

(73) Assignees: Chang Sub Jeon, Goyang-si, Gyeonggi-do (KR); Keun Woo Lee, Goyang-si, Gyeonggi-do (KR)

( * ) Notice: Subject to any disclaimer, the term of this patent is extended or adjusted under 35 U.S.C. 154(b) by 29 days.

(21) Appl. No.: 16/339,985

(22) PCT Filed: Sep. 29, 2017

(86) PCT No.: PCT/KR2017/010978
§ 371 (c)(1),
(2) Date: Apr. 5, 2019

(87) PCT Pub. No.: WO2018/066935
PCT Pub. Date: Apr. 12, 2018

(65) Prior Publication Data
US 2020/0044998 A1 Feb. 6, 2020

(30) Foreign Application Priority Data

Oct. 5, 2016 (KR) .......... 10-2016-0128337
May 30, 2017 (KR) .......... 10-2017-0067051

(51) Int. Cl.
G06F 15/16 (2006.01)
H04L 12/58 (2006.01)
(Continued)

(52) U.S. Cl.
CPC .......... *H04L 51/046* (2013.01); *A63F 13/80* (2014.09); *G06Q 30/0252* (2013.01);
(Continued)

(58) Field of Classification Search
CPC ... H04L 51/046; H04L 51/02; H04L 12/1813; A63F 13/80; A63F 2300/8064; G06Q 30/0252; G06Q 30/0267; G06Q 30/0277
(Continued)

(56) References Cited

U.S. PATENT DOCUMENTS 5,823,879 A * 10/1998 Goldberg .......... G06F 16/9535
463/42
7,818,183 B2 * 10/2010 Schoenberg ....... G06Q 30/0633
705/2
(Continued)

FOREIGN PATENT DOCUMENTS

EP 1195184 A2 4/2002
JP 2002-312664 A 10/2002
(Continued)

*Primary Examiner* — Alicia Baturay
(74) *Attorney, Agent, or Firm* — Novick, Kim & Lee, PLLC; Jae Youn Kim

(57) ABSTRACT

A method, system, and quiz server for providing a quiz and an advertisement simultaneously in an IMS chat is provided. The method includes creating a chat room from a mobile terminal while inviting a pre-registered quizbot as a chat participant, displaying a quiz and an advertisement within the chat room on the mobile terminal in the form of a chat message composed by the quizbot, and displaying, within the chat room, an answer of a certain chat participant with respect to the quiz, and inputting a result of determination of whether the answer is correct into the chat room by using the quizbot, displaying, within the chat room, the answer of the certain chat participant with respect to the quiz, and input-
(Continued)

ting a result of determination of whether the answer is correct into the chat room by using the quizbot.

27 Claims, 17 Drawing Sheets

(51) Int. Cl.
  *A63F 13/80* (2014.01)
  *G06Q 30/02* (2012.01)
  *H04L 12/18* (2006.01)
(52) U.S. Cl.
  CPC ..... *G06Q 30/0267* (2013.01); *G06Q 30/0277* (2013.01); *H04L 12/1813* (2013.01); *H04L 51/02* (2013.01); *A63F 2300/8064* (2013.01)
(58) Field of Classification Search
  USPC ........................................................ 709/209
  See application file for complete search history.

(56) References Cited

U.S. PATENT DOCUMENTS

| | | | | |
|---|---|---|---|---|
| 8,065,286 | B2* | 11/2011 | Jones | G06F 16/24578 707/706 |
| 8,229,951 | B2* | 7/2012 | Nickell | G06F 16/951 707/767 |
| 8,700,665 | B2* | 4/2014 | Beauregard | H04L 12/1827 707/791 |
| 10,218,649 | B2* | 2/2019 | Joo | H04L 51/02 |
| 2002/0042293 | A1* | 4/2002 | Ubale | G06Q 30/02 463/9 |
| 2003/0182391 | A1* | 9/2003 | Leber | G06F 16/951 709/217 |
| 2007/0033107 | A1* | 2/2007 | Ubale | G06Q 30/0209 705/14.19 |
| 2008/0102430 | A1* | 5/2008 | Rogers | G09B 7/02 434/350 |
| 2008/0102432 | A1* | 5/2008 | Rogers | G09B 7/02 434/350 |
| 2008/0108038 | A1* | 5/2008 | Rogers | G09B 7/00 434/350 |
| 2010/0114684 | A1* | 5/2010 | Neged | G06Q 10/10 705/14.14 |
| 2014/0074951 | A1* | 3/2014 | Misir | H04L 12/1827 709/206 |
| 2014/0207882 | A1 | 7/2014 | Joo et al. | |

FOREIGN PATENT DOCUMENTS

| | | |
|---|---|---|
| JP | 2014-142919 A | 8/2014 |
| JP | 2015-534737 A | 12/2015 |
| KR | 10-2001-0090189 A | 10/2001 |
| KR | 10-2005-0034818 A | 4/2005 |
| KR | 10-2008-0108164 A | 12/2008 |
| KR | 10-2010-0091295 A | 8/2010 |
| KR | 10-1357441 B1 | 2/2014 |
| KR | 10-2014-0042660 A | 4/2014 |
| KR | 10-2014-0085619 A | 7/2014 |

* cited by examiner

METHOD AND SYSTEM FOR PROVIDING QUIZ TOGETHER WITH ADVERTISEMENT IN INSTANT MESSAGE SERVICE (IMS) CHAT ROOM

TECHNICAL FIELD

The present invention relates to a method and system for providing a quiz and an advertisement simultaneously in an instant message service (IMS) chat room. More particularly, the present invention relates to a quiz and advertisement providing system and method using an IMS chat room, the system and method providing a quiz and an advertisement simultaneously in an IMS chat room by involving a quizbot serving as a chat participant in the IMS chat room.

BACKGROUND ART

An instant message service (IMS) means a real-time online communication service in which a message sent from a sender mobile terminal appears, in real time, on the screen of a recipient mobile terminal without involving an e-mail service application or a web browser. In particular, a service that enables chatting, a voice call, a video call, etc. over a mobile network is called a mobile instant messenger (MIM) service.

An instant message service (IMS) supports real-time communication among multiple entities over a network such as the Internet. For example, by using an IMS chat room, subscribers to an instant message service (IMS) can send and receive, in real time, various types of data such as photographs, videos, emoticons, and audio, as well as text messages.

An instant messenger referred to as an instant messaging application program is installed as a client in a mobile terminal of a user subscribed to an instant message service (IMS). As mobile terminals such as smart phones and tablet PCs are widely used and communication technologies are advanced, users more frequently use an instant message service (IMS) rather than a short message service (SMS) provided by mobile communication service providers.

Thus, the number of users subscribed to an instant message (IM) services is increasing dramatically, and this increase results in creation or expansion of other businesses such as advertising.

Currently, in a traditional instant message service (IMS), chat participants, who are usually known to each other, use chat rooms for mainly private conversations. That is, currently available IM services do not have a fun and entertaining feature of enabling a chat room creator to invite an external quiz provider as a chat participant to draw attention from chat participants in the chat room, thereby enabling IMS subscribers to use a chat room to enjoy the fun and to increase a knowledge through taking a trivia quiz provided by the quiz provider.

DISCLOSURE

Technical Problem

An objective of the present invention is to provide a method and system for providing a quiz and an advertisement simultaneously in an IMS chat room in which a quizbot operating on a quiz server participates as a chat participant to provide quizzes and advertisements in the IMS chat room.

Another objective of the present invention is to provide a method and system for providing various quizzes and advertisements to chat participants in a chat room, thus increasing an advertising effect.

A further objective of the present invention is to provide a method and system for providing a quiz to a chat room that is configured such that chat participants can take the quiz, earn a preset number of points as rewards for correctly answering the quiz, and redeem the earned points in various ways.

A further objective of the present invention is to provide a quiz server that supports implementation of a method of providing a quiz and an advertisement simultaneously.

Technical Solution

According to one aspect of the present invention, there is provided a method of providing a quiz and an advertisement simultaneously in an IMS chat room by involving a quizbot, the method including: a registration step in which a quiz server registers a quizbot as a chat participant so that the quizbot provides a quiz and an advertisement simultaneously in an instant message service (IMS) chat room; a creation step of creating a chat room from a mobile terminal while adding the quizbot as one of chat participants; a first transfer step in which information of the chat participants in the chat room is transferred from a chat server to the quiz server when the quizbot is added to the chat room as one of the chat participants or when a quiz question submission request is input by one of the chat participants after the quizbot is added to the chat room; a first request step in which the quiz server transfers the information of the chat participants to a question pool server while requesting the question pool server to extract quiz information catered to the chat participants on the basis of the information of the chat participants; a second transfer step in which the question pool server extracts the quiz information catered to the chat participants and transmits the extracted quiz information to the quiz server; a second request step in which when the quiz server receives the quiz information from the question pool server, the quiz server transfers the information of the chat participants and the received quiz information to an advertisement server while requesting the advertisement server to extract advertisement information on the basis of the information of the chat participants and the quiz information; a third transfer step in which the advertisement server extracts the advertisement information on the basis of the information of the chat participants and the quiz information and transmits the extracted advertisement information to the quiz server; a fourth transfer step in which the quiz server transfers the received quiz information and the received advertisement information to the chat server; a first display step in which the chat server displays the received quiz information and the advertisement information in the form of chat messages composed by the quizbot; a second display step of displaying, within the chat room on the mobile terminal, answers input by each of the chat participants; and an input step in which the chat server receives, from the quiz server, a result of determination of whether the answers input by each of the chat participants in the chat room are correct, and the quizbot inputs the determination result into the chat room in the form of a chat message.

According to another embodiment of the present invention, there is provided a method of providing a quiz and an advertisement simultaneously in an instant message service (IMS) chat room, the method including: a registration step in which a quiz server registers a quizbot as a chat participant so that the quizbot can provide a quiz and an advertisement to an instant message service (IMS) chat room; a creation step in which a chat room is created from a mobile terminal while adding at least one chat participant to the chat room; a maintaining step of maintaining the chat room by displaying, within the chat room on the mobile terminal, chat messages input by each of the chat participants; an addition step of adding the quizbot registered as a chat participant to the chat room on the mobile terminal; a first transfer step in which the chat server transfers information of the chat participants of the chat room to the quiz server when the quizbot is added to the chat room as one of the chat participants or when a quiz question submission request is input by one of the chat participants after the quizbot is added to the chat room; a first request step in which the quiz server transfers the information of the chat participants to a question pool server while requesting the question pool server to extract quiz information catered to the chat participants on the basis of the information of the chat participants; a second transfer step in which the question pool server extracts the quiz information catered to the chat participants and transmits the extracted quiz information to the quiz server; a second request step in which when the quiz server receives the quiz information from the question pool server, the quiz server transfers the information of the chat participants and the received quiz information to an advertisement server while requesting the advertisement server to extract advertisement information on the basis of the information of the chat participants and the quiz information; a third transfer step in which the advertisement server extracts the advertisement information on the basis of the information of the chat participants and the quiz information and transmits the extracted advertisement information to the quiz server; a fourth transfer step in which the quiz server transfers the received quiz information and the received advertisement information to the chat server; a first display step in which the chat server displays the received quiz information and the received advertisement information within the chat room in the form of chat messages composed by the quizbot; a second display step of displaying, within the chat room on the mobile terminal, answers input by each of the chat participants; and an input step in which the chat server receives, from the quiz server, a result of determination of whether the answers input into the chat room are correct and the quizbot inputs the determination result into the chat room in the form of a chat message.

According to a further embodiment of the present invention, there is provided a method of providing a quiz and an advertisement simultaneously in an instant message service (IMS) chat room, the method including: a registration step in which a quiz server registers a quizbot as a chat participant in a chat server to provide a quiz and an advertisement simultaneously to the IMS chat room by using the quizbot; a provision step in which the chat server creates a chat room at a request of a mobile terminal for creation of the chat room and provides the created chat room to the mobile terminal; an addition step in which the mobile terminal adds the registered quizbot to the chat room as one of chat participants; a first transfer step in which information of the chat participants of the chat room is transferred to the quiz server from the chat server when the quizbot is added as one of the chat participants or when a quiz question submission request is input by a chat participant after the quizbot is added as one of the chat participants; a first request step in which the quiz server transfers the information of the chat participants to a question pool server while requesting the question pool server to extract quiz information catered to the chat participants on the basis of the information of the chat participants; a second transfer step in which the question pool server extracts the quiz information catered to the chat participants and transmits the extracted quiz information to the quiz server; a second request step in which when the quiz server receives the quiz information from the question pool server, the quiz server transfers the information of the chat participants and the received quiz information to an advertisement server while requesting the advertisement server to extract advertisement information on the basis of the information of the chat participants and the quiz information; a first transmission step in which the advertisement server extracts the advertisement information on the basis of the information of the chat participants and the quiz information and transmits the extracted advertisement information to the quiz server; a third transfer step in which the quiz server transfers the quiz information and the advertisement information to the chat server; a first display step in which the chat server displays the received quiz information and the received advertisement information within the chat room in the form of chat messages composed by the quizbot; a second display step of displaying, within the chat room on the mobile terminal, answers input by each of the chat participants; a second transmission step in which the answers input by each of the chat participants are transmitted to the quiz server from the chat server; a third transmission step in which the quiz server transmits a result of determination of whether each of the answers with respect to the quiz information is a correct answer to the chat server; and an input step in which the chat server receives, from the quiz server, the result of the determination of whether each of the answers with respect to the quiz information is a correct answer, and causes the quizbot to input the result of the determination into the chat room in the form of a chat message.

According to a further embodiment of the present invention, there is provided a system for providing a quiz and an advertisement simultaneously in an instant message service (IMS) chat room, the system including: a chat server for registering a quizbot as a chat participant so that the quizbot provides a quiz and an advertisement simultaneously to the IMS chat room, for providing an IMS chat room to a mobile terminal at a request of the mobile terminal, for maintaining the IMS chat room by displaying, within the IMS chat room, chat messages input by each of the chat participants in the IMS chat room, for transferring information of the chat participants of the chat room when the quizbot is added to the chat room as one of the chat participants or when a quiz question submission request is input by any one of the chat participants after the quizbot is added to the IMS chat room, and for displaying quiz information and advertisement information in the form of chat messages composed by the quizbot within the chat room when the quiz information and the advertisement information are received; a quiz server for requesting the chat server to register the quizbot as a chat participant, receiving the information of the chat participants from the chat server when the quizbot is added to the chat room as a chat participant, transferring the information of the chat participants to a question pool server while requesting the question pool server to extract quiz information catered to the chat participants on the basis of the information of the chat participants, receiving the extracted quiz information, transferring the information of the chat participants and the quiz information to an advertisement server when the quiz information is received from the question pool server while requesting the advertisement server to extract and transmit advertisement information corresponding to the information of the chat participants and the quiz information, and transferring the quiz information and the advertisement information to the chat server when the advertisement information is received; the question server for registering a plurality of quiz questions in a quiz question database, extracting the quiz information corresponding to the information of the chat participants at a quiz information request of the quiz server, and transmitting the extracted quiz information to the quiz server; the advertisement server for registering a plurality of advertisements in an advertisement database, and extracting and transmitting the advertisement information corresponding to the information of the chat participants and the quiz information received from the quiz server at an advertisement information request of the quiz server, in which from the mobile terminal, the chat room to which the quizbot is added as one of the chat participants is created, an answer input by one of the chat participants is displayed within the chat room, and a result of determination of whether the answer is a correct answer is input into the chat room in the form of a chat message composed by the quizbot.

Advantageous Effects

According to the present invention, many chat participants can take a quiz and earn a preset number of points for providing a correct answer to the quiz in an IMS chat room. The awarded points are then accumulated. Therefore, the chat participants can enjoy a fun and entertaining activity and increase a knowledge on various topics by taking the quiz.

In addition, according to the present invention, it is possible to differently set a question type, a difficulty, a grade level, and the like of a quiz according to chat participants. Therefore, it is possible to provide quiz questions that are tuned to the chat participants on the basis of user information including ages, hobbies, interests, etc. of the chat participants.

In addition, according to the present invention, since the quiz server can provide a quiz and an advertisement to many chat participants simultaneously by using a chat room, an advertising effect can be naturally obtained while the chat participants take the quiz.

In addition, according to the present invention, since the chat participants can redeem the points that are awarded each time that each of the chat participants solves a quiz within an IMS chat room in various ways, it is possible to encourage the chat participants to actively participate in taking the quiz within the chat room.

BEST MODE

Herein below, exemplary embodiments of the present invention will be described in detail with reference to the accompanying drawings. Reference should be made to the drawings, in which the same reference signs or numerals are used throughout the drawings to designate the same or similar components. Further, in describing exemplary embodiments of the present invention, well-known functions or constructions will not be described in detail when it is determined they may obscure the understanding of the exemplary embodiments of the present invention.

Terms, such as first, second, A, B, (a), (b), etc. may be used herein to describe elements of the present invention. Each of these terms is not used to define essence, order, sequence, or number of an element, but is used merely to distinguish one element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

Figure 1:
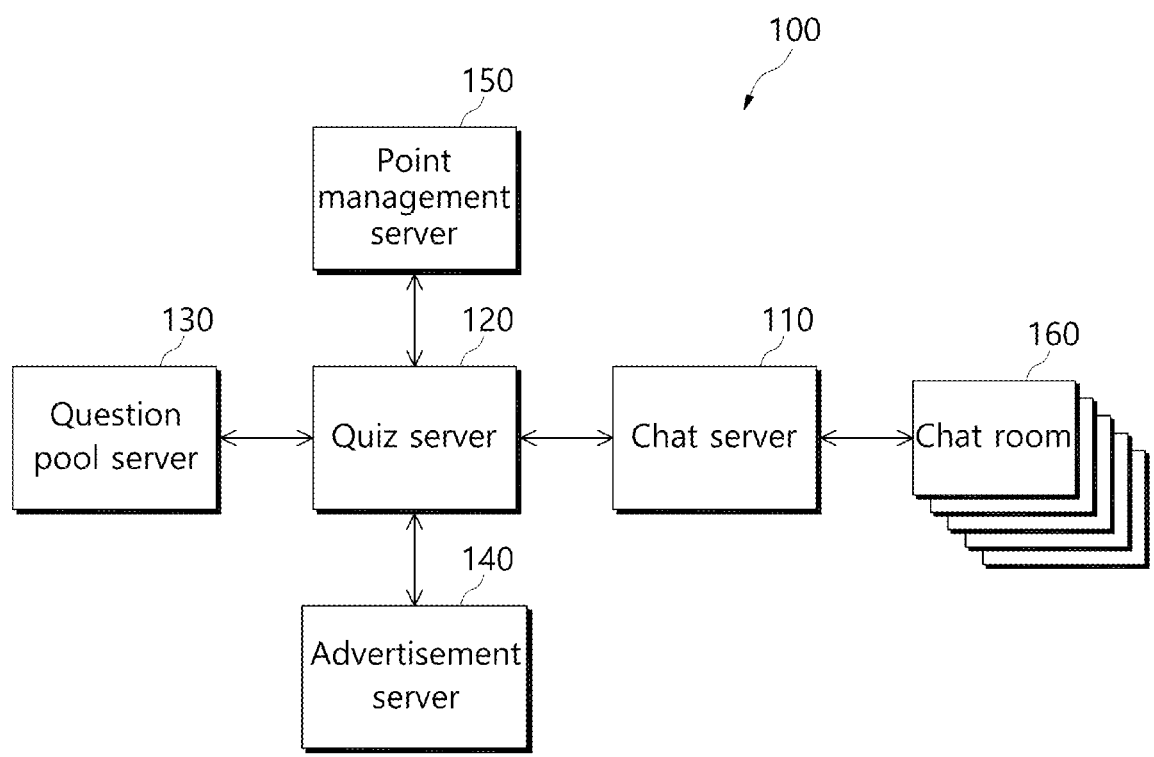
FIG. 1 is a block diagram illustrating the overall configuration of a system for providing a quiz and an advertisement to chat participants in a chat room, according to the present invention.
Figure 2:
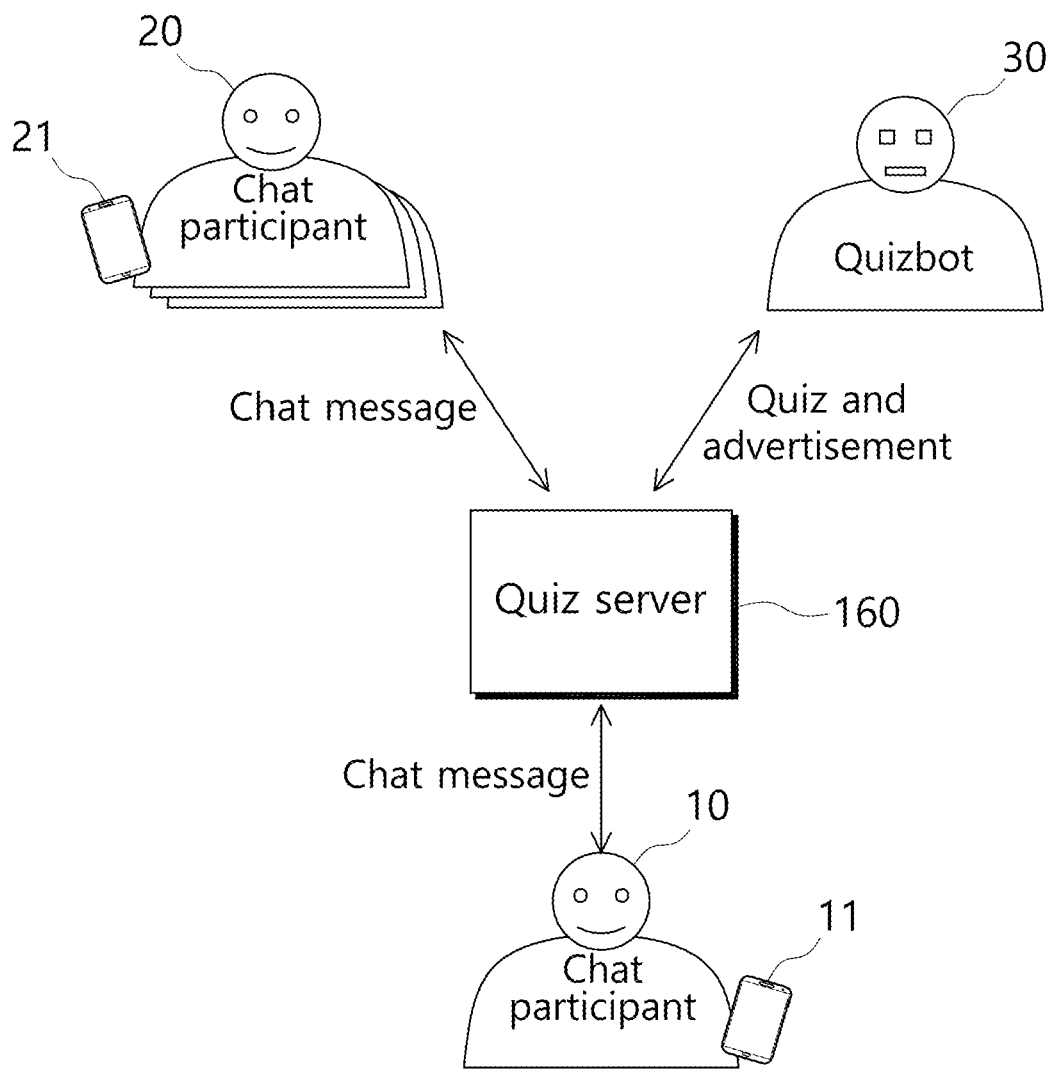
FIG. 2 is a diagram schematically illustrating a concept that a plurality of chat participants and a quizbot exchange chat messages in a chat room, according to the present invention.
Figure 3:
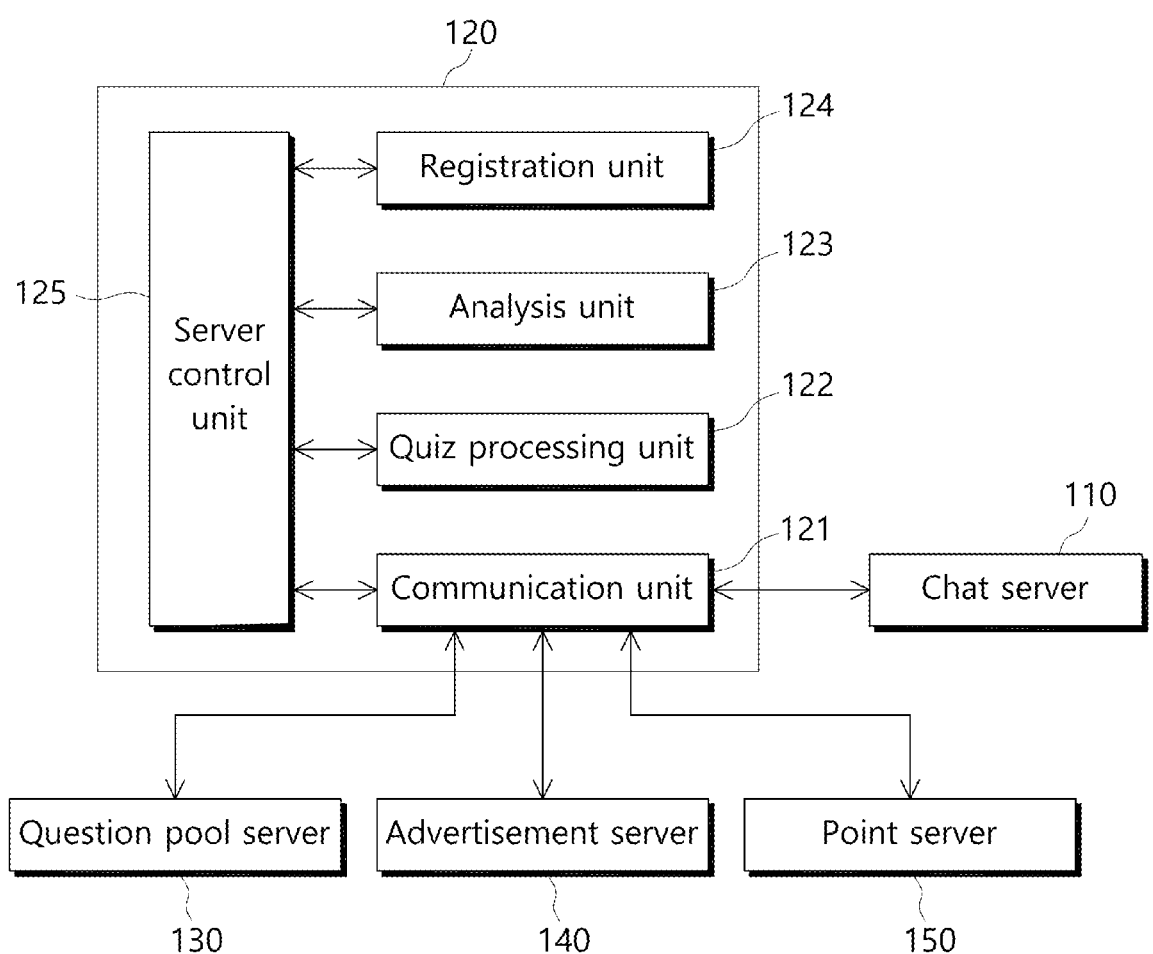
FIG. 3 is a block diagram illustrating the configuration of a quiz server according to the present invention.

FIG. 1 is a diagram illustrating the overall configuration of a system for providing a quiz and an advertisement using a chat room according to an embodiment of the present invention. FIG. 2 is a schematic diagram illustrating a concept that a plurality of chat participants and a quizbot according to an embodiment of the present invention exchange chat messages within a chat room. FIG. 3 is a configuration block diagram of a quiz server according to one embodiment of the present invention.

Referring to the drawings, a quiz and advertisement providing system 100 using a chat room, according to the present invention, includes a chat server 110 and a quiz server 120.

The chat server 110 provides an instant message service (IMS) chat room to mobile terminals 11 and 21 when receiving an IMS chat room creation request from at least one of the mobile terminals 11 and 21 and maintains the IMS chat room by displaying chat messages input by chat participants within the IMS chat room. That is, the chat server 110 provides an instant messaging (IM) service by which a plurality of chat participants can exchange chat messages through various chat rooms.

The mobile terminals 11 and 21 can implement a chat service by using a specific application program (i.e., an application program for servicing a chat room) installed in the mobile terminals 11 and 21. The specific application program may be a chatting program that can create a chat room. The chat room providing service is a so-called instant messaging service (IMS). In this service, the user of one of the mobile terminals 11 and 21 creates a chat room to exchange chat messages with the user of the other mobile terminal. Thus, the users of the mobile terminals 11 and 21 can exchange chat messages with each other through the chat room. These chat messages are displayed as instant messages within the chat rooms of the respective mobile terminals 11 and 21. The users of the mobile terminals 11 and 21 can remove the chat rooms as well as create the chat rooms from their mobile terminals 11 and 21.

The mobile terminals 11 and 21 download and install a chat application that provides an IMS chat function by performing data communication with the chat server 110, thereby using an IMS chat function provided by the chat server 110. When the chat application is installed in each of the mobile terminals 11 and 21, chat messages can be input, received, and displayed within the chat rooms on the mobile terminals 11 and 21 via the chat server 110. In addition, various personalized settings for a chat room and additional functions supported by the chat server 110 can be used from the mobile terminals.

The quiz server 120 can register a quizbot 30 as a virtual chat participant in the chat server 110, to provide a quiz and an advertisement to chat participants within a chat room by using the quizbot 30. The quizbot 30 participates in chatting with other chat participants within the chat room and provide a quiz and an advertisement when they are invited (or added or participated) by the quiz server 120 as a virtual chat participant registered in the chat server 110. In other words, when the quizbot 30 is added to the chat room as one of the chat participants, or when a quiz question submission request is input by a certain chat participant of the chat participants in the chat room after the quizbot 30 is added to the chat room, the quiz server 120 transmits a quiz and an advertisement selected by the chat participant to the chat server 110 at the request of the chat server 110.

The quiz server 120 fundamentally has a function of enabling the quizbot 30 to input a quiz and an advertisement to be provided to the chat participants in the chat room provided by the chat server 110. When the quizbot 30 is added as a chat participant to a specific chat room or when a quiz question submission request is input by a chat participant after the quizbot 30 is added to the specific chat room, the quiz server 120 transmits a quiz and an advertisement to the chat server 110 so that the quizbot 30 can input the quiz and the advertisement in the form of chat messages in the specific chat room. The chat server 110 causes the quizbot 30 to input the received quiz and the received advertisement into the specific chat room as chat messages.

For example, as shown in FIG. 2, when a first chat participant 10 creates a chat room 160 from the mobile terminal 11 owned by the first chat participant 10 and then adds a second chat participant 20 and the quizbot 30 as chat participants to the chat room 160, since the first chat participant 10, the second chat participant 20, and the quizbot 30 are participating in the chat room 160, they can all input their chat messages in the chat room 160. In this case, all the chat messages input by each of the chat participants 10, 20, and 30 are displayed in the chat room 160, whereby each of the chat participants 10, 20, and 30 can see the chat messages input by the chat participants other than oneself as well as the chat messages input by oneself from the display of his or her mobile terminal.

In particular, when the quizbot 30 is added to the chat room 160 as a chat participant, the chat server 110 notifies the quiz server 120 that the quizbot 30 is added as a chat participant to a specific chat room. In this case, the quiz server 120 requests a question pool server 130 and an advertisement server 140 to send a quiz and an advertisement, respectively, receives the quiz and the advertisement from the question pool server 130 and the advertisement server 140, and transmits the quiz and the advertisement to the chat server 110. The chat server 110 receives the quiz and the advertisement and causes the quizbot 30 to input the quiz and the advertisement into the chat room 160 in the form of chat messages. That is, since the quizbot 30 serves as a chat participant, the quizbot 30 can input the quiz and the advertisement in the form of chat messages in the chat room. Therefore, the first chat participant 10 and the second chat participant 20 in the chat room can see the quiz and the advertisement input by the quiz bob 30 from the chat room.

Accordingly, the first and second chat participants 10 and 20 can input their answers to solve the quiz provided by the quizbot 30 in the chat room as a chat message, whereby the chat participants 10 and 20 other than the quizbot 30 are exposed to the advertisement while solving the quiz provided by the quizbot 30. In one embodiment of the present invention, it is necessary to distinguish a general chat message from a quiz-answering chat message which refers to a chat message for answering to a quiz. For example, the quiz-answering chat message is accompanied with a predetermined character at the beginning or at the end of a chat message. For example, when a predetermined character such as "@" or "#" is input first and then a chat message is input immediately behind the predetermined character "@" or "#", the chat message with the predetermined character attached to the head of the chat message is regarded as an answer to the quiz.

For example, when the quizbot 30 submits a quiz question of "what island is located at the far east end of Korea?", and a chat message of "@Dokdo" is input by a certain chat participant, the chat message "@Dokdo" is regarded as an answer to the quiz rather than a general chat message for conversation among the chat participants. For multiple-choice quizzes, when a specific character followed by a number, such as "@2", is input, the number with the specific character is regards as an answer to a multiple-choice quiz question.

When several answers are input by respective chat participants within the chat room, the chat server 110 transmits all of the answers to the quiz server 120, and the quiz server 120 checks whether the answers are correct and transmits the results of the checking to the chat server 120. The chat server 120 causes the quizbot 30 to input a correct answer into the chat room so that the correct answer is provided to the chat participants in the chat room. At this time, the names of the chat participants who have correctly answered are displayed within the chat room.

In addition, the quiz server 120 will give a predetermined hint in the form of a chat message composed by the quizbot 30 within the chat room when there is no answer input by any chat participant or when no correct answer to the quiz is found among answers input by a predetermined ratio or higher ratio of the chat participants within a preset time limit beginning at the submission of the quiz. On the other hand, when the quizbot 30 provides extra information regarding the correct answer to the quiz. The chat participants who have submitted the correct answer will be rewarded with the accrual of a preset number of points. This will be described in detail below.

The quiz and advertisement providing system 100 based on a chat room, according to the present invention, further includes a question pool server 130, an advertisement server 140, and a point management server 150.

The question pool server 130 operates in conjunction with a question pool database (not illustrated). The question pool server 130 has a function of registering and storing various quiz questions in the question pool database. The question pool server 130 can register various quizzes in the question pool database by classifying quiz questions by age group, occupation, subject, question type (multiple choice type or short-answer/essay type), subclass of question type, difficulty, and category of quiz questions. For example, the quiz questions may cover a wide range of topics or subjects including general knowledge, Korean, English, science, history, religion, and the like, may be random in question types including multiple-choice questions and short-answer questions, and may be used for promotion of administration affairs of the national government, survey, public opinion poll, or the like. The difficulty of the quizzes is divided into S, A, B, and C classes, and the quiz answerers are awarded a varying number of points depending on the class in terms of the difficulty of the quiz. When a certain chat participant in a chat room selects from several options in terms of a question type, category, and difficulty class of a quiz, the quiz server 120 requests the question pool server 130 to select quiz questions on the basis of the question type, category, and difficulty class that are selected by the chat participant and receives the selected quiz questions.

The advertisement server 140 operates in conjunction with an advertisement database (not illustrated). The advertisement server 140 has a function of registering and storing various advertisements in the advertisement database. The advertisement server 140 generates an advertisement that fits in a predetermined advertisement platform so that the advertisement can be entered as a chat message into a chat room and registers the generated advertisement in the advertisement database. The advertisement server 140 has a function of converting advertisements provided by a plurality of advertisers into chat message forms that can be displayed within chat rooms and registering the resulting advertisements in the advertisement database. The advertiser can select advertisements according to a specific difficulty class and a specific question type of a quiz to provide customized advertisements suitable for the quiz participants.

The question pool server 130 and the advertisement server 140 allow quizzes and advertisements to be transmitted to the quiz server 120 in a specific order at the request of the quiz server 120. This is because the chat server 110 makes a request for a quiz and an advertisement with respect to the quiz server 120 when the quizbot 30 is added to the chat room or when a quiz question submission request is input by a chat participant after the quizbot 30 is added to the chat room. That is, the quiz server 120 makes a request for a quiz from the question pool server 130 and a request for an advertisement from the advertisement server 140. When the chat server 110 receives a quiz and an advertisement from the quiz server 120, the chat server 110 causes the quizbot 30 to input the received quiz and the received advertisement into the chat room in the form of chat messages.

Quiz information such as category, a question type, a difficulty class, and a rating of a quiz that is to be input into the chat room can be set and changed by each of the chat participants in the chat room. Specifically, when the quizbot 30 is added to the chat room as one of the chat participants, the other chat participants can select at least one piece of the quiz information input by the quizbot 30 from their mobile terminals. This is to allow the chat participants to select a category, difficulty class, topic, etc. of a quiz to be taken by the chat participants. In the present invention, when the quizbot 30 is invited to the chat room, the quiz server 120 requests the chat server 110 to transmit user information of the chat participants thereto and requests the quiz question pool server 130 and the advertisement server 140 respectively to transmit a quiz and an advertisement suitably selected on the basis of the user information of the chat participants thereto. The question pool server 130 and the advertisement server 140 extract the optimum quiz and the optimum advertisement from the question pool database and the advertisement database, respectively, at the request of the quiz server 120 and transmits the extracted optimum quiz and the extracted optimum advertisement to the chat server 110 so that the quizbot can input the quiz and the advertisement into the chat room. This has an effect of drawing attention from the chat participants by providing the quiz and the advertisement that cater to the chat participants.

The quizbot 30 can provide various quizzes and advertisements and can exchange chat messages with other chat participants to provide a predetermined event service to the other chat participants. In addition, the quizbot 30 can interactively chat with the other chat participants in the chat room under the control of the quiz server 120. Particularly, the quizbot 30 can identify chat messages input by the respective chat participants and can automatically make an appropriate reply in the form of chat messages to each of the other chat participants.

Within the chat room 160, a conversation among a plurality of chat participants can be performed. When a certain chat participant adds the quizbot 30 as one of the chat participants to a specific chat room, the information on the added quizbot 30 is displayed in a predetermined region of the chat room so that the other chat participants can be provided with the information on the quizbot 30. In the present invention, the number of the quizbots 30 may be one or more. This is to give a choice in quizbots so that a suitable quizbot can be used according to the selected options such as a question type, a category, and a technical category.

Referring to FIG. 3, the quiz server 120 includes a communication unit 121, a quiz processing unit 122, an analysis unit 123, a registration unit 124, and a server control unit 125.

The communication unit 121 performs communication with various external servers. That is, the communication unit 121 performs communication with each of the chat server 110, the question pool server 130, the advertisement server 140, and the point management server 150.

The registration unit 122 registers and manages various quizbots 30 by working in conjunction with a database (not illustrated). The chat server 110 registers the quizbots 30 as chat participants.

The quiz processing unit 123 transmits a quiz and an advertisement to the chat server 110 so that the quizbot 30 that is added as a chat participant to the chat room 160 can input the quiz and the advertisement into the chat room 160 in the form of chat messages when a request for a quiz and an advertisement is received from the chat server 110.

The analysis unit 124 analyzes the answers to determine whether or not the answers received from the chat server 110 are correct answers and transmits the analysis result to the chat server 110 via the communication unit 121.

In the quiz server 120 configured as described above, the communication unit 121 communicates with the question pool server 130 and the advertisement server 140, and the quiz processing unit 123 requests and receives a quiz and an advertisement from the question pool server 130 and the advertisement server 140, respectively when receiving a request of the chat server 110, and then forwards the quiz and the advertisement that are received from the question pool server 130 and the advertisement server 140 to the chat server 110.

In this process, when the quiz processing unit 123 receives at least one piece of the quiz information including a question type, difficulty class, category, and rating of a quiz from the chat server 110, the quiz processing unit 120 makes a request for quizzes in compliance with the quiz information and receives the quizzes from the question pool server 130. Next, the quiz processing unit 123 forwards the received quizzes to the chat server 123.

The analysis unit 124 analyzes each of the answers to determine whether each of the answers to the quiz is a correct answer and transmits the analysis result to the quiz processing unit 123. When the analysis unit 124 determines that a certain answer of the answers is a correct answer, the quiz processing unit 123 transmits a request for accrual of points credited to user ID (user account) of the chat participants who have submitted the correct answer, to the point management server 150, receives a notification for the accrual of the points credited to the user ID from the point management server 150, and forwards the notification to the chat server 110 in the form of a chat message. Then, the chat server 110 causes the quizbot 30 to input a chat message indicating that the points credited to the user ID have been added to the total of existing points.

Hereinafter, an exemplary process in which a quiz is provided to a chat room by a quizbot and a response (answer) to the quiz is input into the chat room and then processed will be described with reference to the accompanying drawings. Such an example is provided for convenience of description, and the present invention is not limited thereto.

Figure 4:
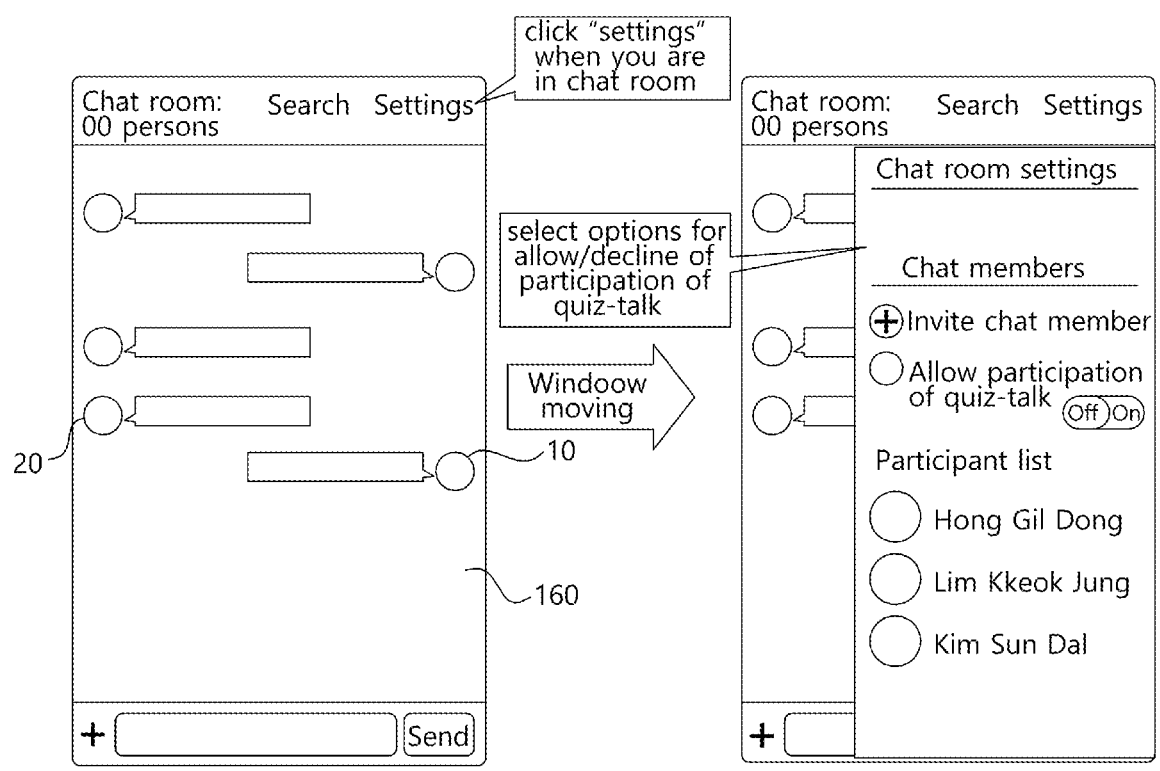
FIG. 4 is a view illustrating the layout of a chat room on a display screen of a mobile terminal that creates a chat room by adding a quizbot according to the present invention as a chat participant.

FIG. 4 is a view illustrating the layout of a display screen of a mobile terminal that creates a chat room by adding a quizbot to the chat room as a chat participant, according to the present invention.

An IMS user who wants to participate in taking quizzes can open a quiz chat room. The IMS user who has opened the quiz chat room can take quizzes by adding a quizbot 30 to the existing quiz chat room. This is achieved by changing the chat room settings based on the existing quiz chat room. Specifically, by changing the default settings such that the menu item "allow quizbot" is switched to "ON", the quizbot 30 is allowed to participate in the quiz chat room. When the quizbot 30 becomes a member of the chat room, the chat server 110 notifies the quiz server 120 that the quizbot 30 is added to the quiz chat room as a chat participant. Since then, the quiz server 120 provides quiz questions and advertisements one after another to the chat server 110 at regular time intervals. Next, the chat server 110 causes the quizbot 30 to input a quiz question and an advertisement into the quiz chat room in the form of chat message. Thus, the chat participants in the quiz chat room can solve the quiz question.

In this case, all of the chat participants who have submitted the correct answer to the quiz question are awarded a preset number of points. Alternatively, the first answerer of the quiz participants who have submitted the correct answer may be awarded a preset number of points according to the point settings. The type, difficulty class, rating, and technical category of quiz questions are set to be random by default.

However, the quiz information is preferably settable and changeable by the person who has opened the quiz chat room. That is, the creator of the quiz chat room can select, from options, a specific difficulty class, a specific question type, and a specific advertiser for the quiz and the advertisement to be provided to the quiz chat room. In the case where optional personal information of chat participants such as hobby, interest, and occupations as well as basic personnel information such as age and gender are preliminarily input by the chat participants and stored in the chat server 110, the chat server 110 provides the quiz server 120 with such information so that the quiz server 120 can customize quiz information (quiz questions) tailored to the chat participants on the basis of the information of the chat participants. Thus, the customized quiz information is transmitted to the chat server 120.

Figure 5:
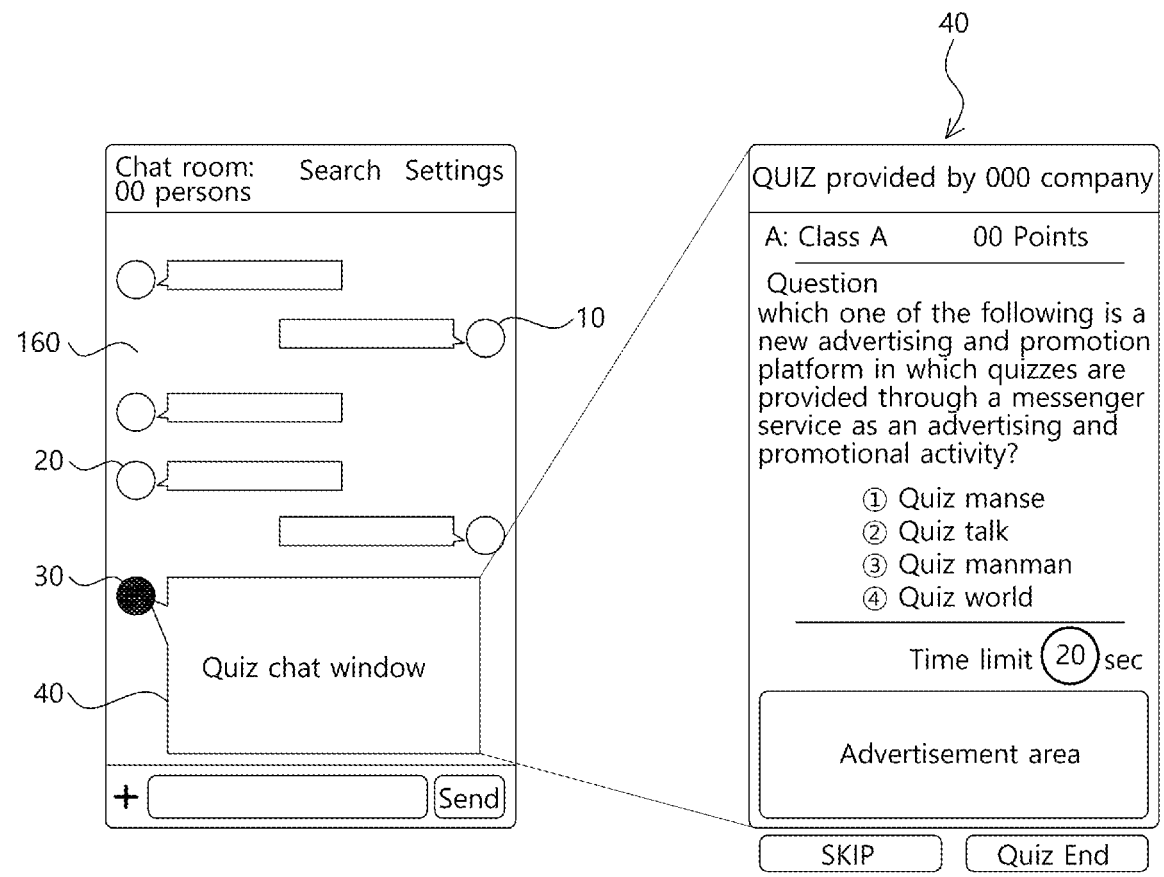
FIGS. 5 and 6 illustrate an example in which a quiz and an advertisement are displayed within a chat room on a mobile terminal according to the present invention.
Figure 6:
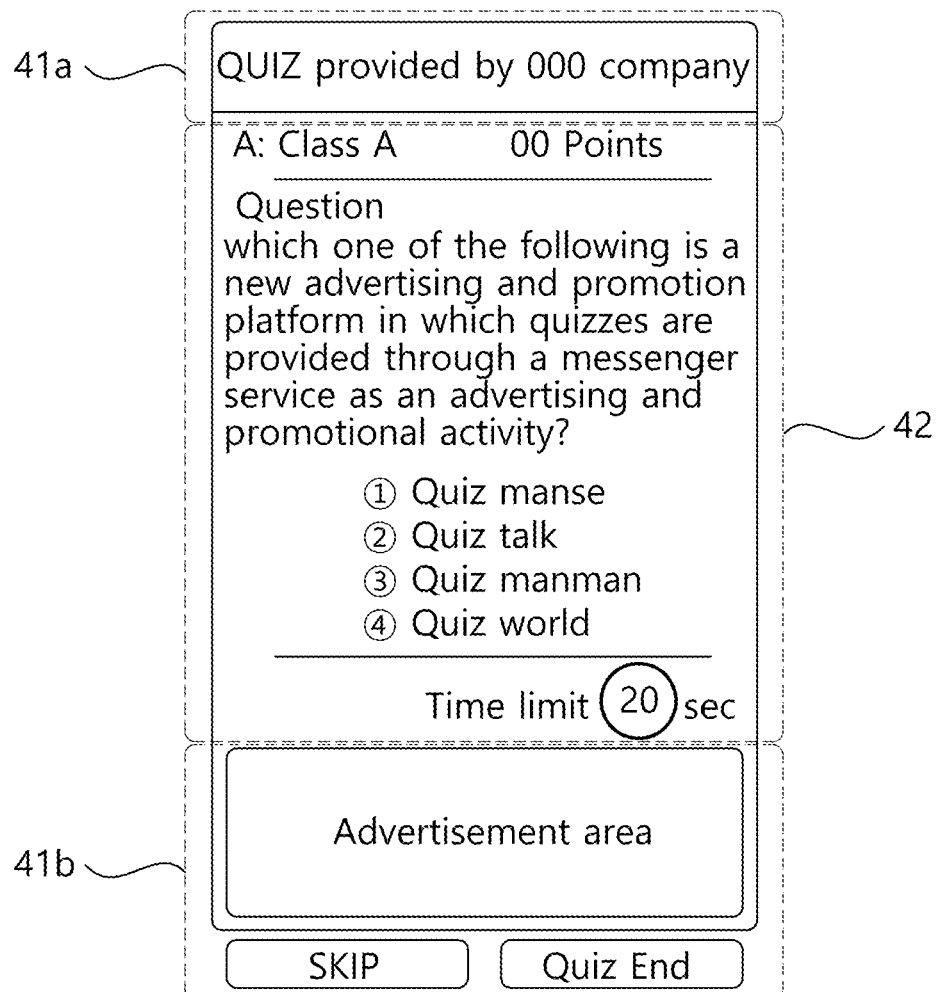

FIGS. 5 and 6 illustrate an example in which a quiz and an advertisement appear in a chat room on a mobile terminal according to the present invention. As illustrated in FIGS. 5 and 6, a plurality of chat participants, including the quizbot 30, can chat by inputting messages into a chat room. The chat message input by the quizbot 30 includes a quiz question and an advertisement.

The user interface (UI) layout of the chat room window on the mobile terminal of the chat participant includes a top bar 41a in which the name or brand of an advertiser is displayed and a bottom bar 41b in which an advertisement provided by the advertiser is displayed. Thus, the chat participants can be continuously exposed to the advertisement while being in connection with the quiz chat room. In order to provide push advertisement to the quiz chat room 160 via the quiz server 120, the advertisers need to have sufficient points to be awarded to the chat participants for rewarding quiz-takers for solving quizzes. The advertisers obtain the points for free or with payment from a service provider that operates the quiz server 120. The advertisers can provide push advertisements to the quiz server so that the advertisements can be displayed in chat rooms until the balance of the points becomes zero.

Various types of quiz questions are provided to the quiz chat room. For example, the quiz questions include multiple-choice questions and short-answer questions. The quiz questions may be randomly submitted as necessary. A chat room windows includes a top region 41a and a bottom region 41b in which advertisements always appear and a middle region 42 positioned between the top region 41a and the bottom region 41b. Within the middle region 42, the difficulty class of a current quiz question and the numbers of points awarded for a correct answer to the current quiz question appear in an upper area, the current quiz question appears thereunder, and a time limit for the current quiz question appears in a lower region below the quiz question. The shape and the position of the middle region 42 for displaying a quiz question may diversely vary.

Figure 7:
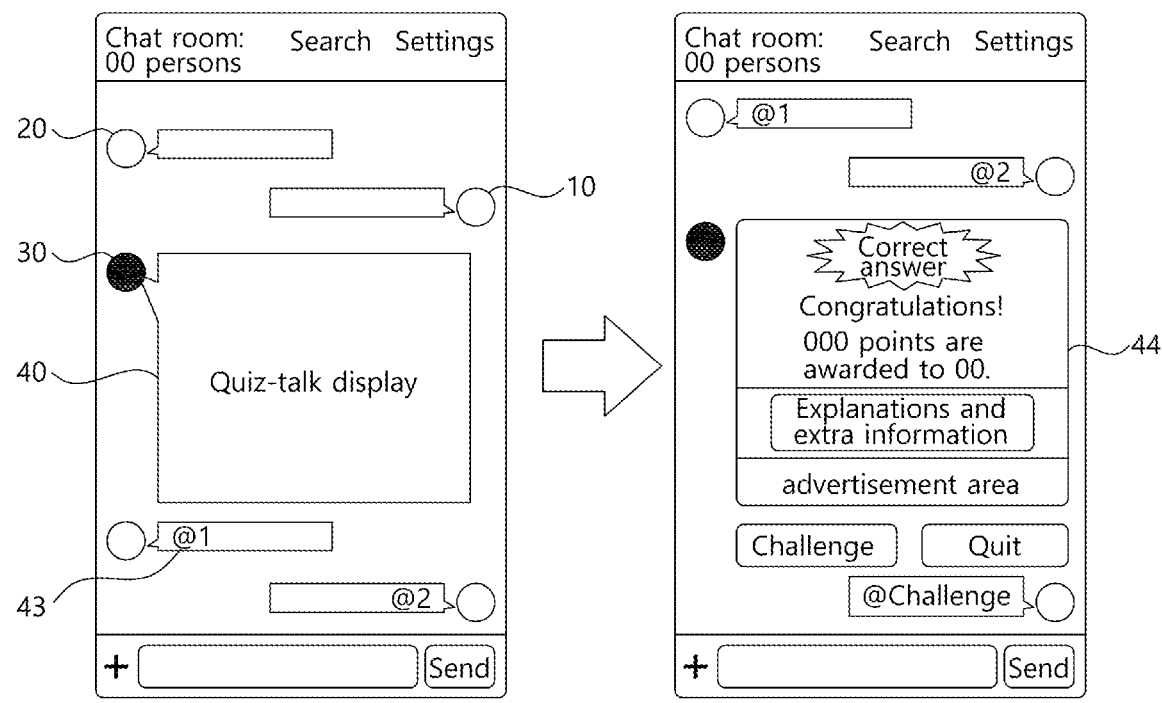
FIGS. 7 and 8 are views illustrating an example of the layout of a chat room on a display screen in which an answer to a quiz is input after the quiz is provided, according to the present invention.
Figure 8:
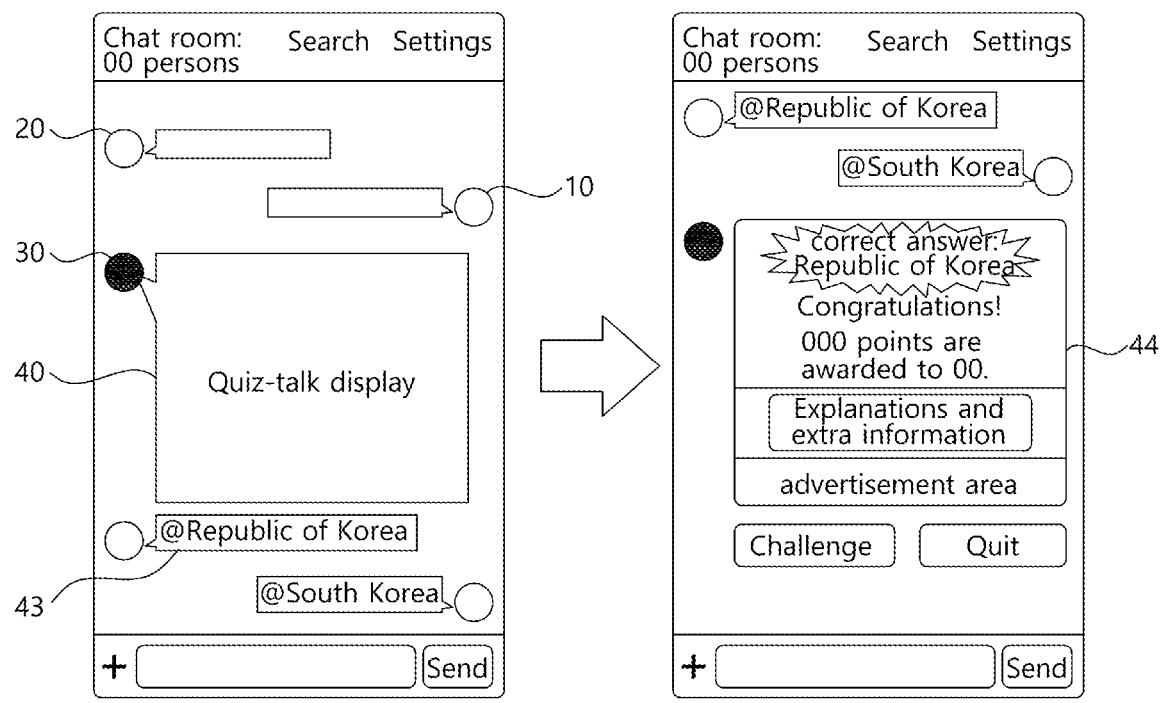

FIGS. 7 and 8 are views illustrating an exemplary UI layout of a chat room in which a quiz question is submitted and an answer to the quiz question is input, according to the present invention. Referring to FIGS. 7 and 8, when the quizbot 30 inputs a quiz question and an advertisement as chat messages into a chat room on a quiz talk screen 40, the other chat participants 10 and 20 input their answers on the quiz talk screen 40. At this time, in the present invention, a certain response rule is set to distinguish an answer to a quiz from a normal response for conversation. In the example of FIG. 7, a specific character "@" is first input and then a chat message serving as an answer to a quiz immediately follows the specific character "@". Of course, a variety of other specific characters can be used to discern an answer to a quiz instead of the character "@", and the position of a specific character indicating an answer to a quiz varies.

As in the case described above, when a message contains a specific character, the chat server 110 determines the message as an answer to a quiz and transmits the answer to the quiz server 120. Then, the quiz server 120 analyzes whether or not the answer is correct and returns the analysis result to the chat server 110. When the answer is determined to be correct, the chat server 110 causes the quizbot 30 to inform the chat participants who have correctly answered of the fact that the answer is correct. That is, a chat message 44 indicating the fact that the participant's answer is correct is sent to the account (user ID) of the chat participant. In addition, a present number of points for rewards for solving each quiz are credited to the personal account (user ID) of each chat participant who has answered correctly. That is, for the personal account (user ID) of each cat participant who answers correctly, the points are allocated and accrued. This answering procedure is applicable to both multiple-choice questions as in FIG. 7 and short-answer questions as in FIG. 8.

For each quiz question submitted in a chat room, answers to the quiz need to be submitted within a predetermined time limit, and answers submitted after the predetermined time limit elapses are invalid. When no answer is submitted in the quiz chat room within a predetermined time limit, or when no correct answer is found among the answers submitted by the chat participants in the quiz chat room, the next quiz question is automatically submitted. When a quiz participant does not want to take the current quiz question, the chat participant may skip to the next quiz question by clicking a "skip" button positioned at the bottom of the user interface layout.

Even though a chat participant is invited to a chat room, when the invited chat participant presses a "stop quiz" button positioned at the bottom of the user interface layout, the quiz session is terminated. That is, no more quiz questions are submitted to the chat room, or the chat room is closed. In the case where the chat room is closed, the quiz session is automatically terminated. When a quiz question is submitted and a chat participant answers correctly to the quiz question, a notification window is created. In the notification window, a text message "correct answer" and the number of points awarded for the quiz question are displayed. In this case, when the chat participant wants to continue taking more quiz questions, the quiz taking is continued by clicking a "next question" button with a specific tag, without waiting for the elapse of a predetermined time. In this case, the next quiz question is immediately submitted. On the other hand, when the "stop quiz" button is pressed, no more quiz questions will be submitted.

According to the present invention, the chat room may be a one-to-one chat room in which one chat participant is a quizbot and the other chat participant is a person who has opened the chat room from his or her mobile terminal. On the other hand, the chat room may be a group chat room having more than two chat participants in which one chat participant is a quizbot, another chat participant is a person (chat rook creator) who has opened the group chat room, and a further chat participant is an invited quiz taker. In the present invention, a one-to-one chat room in which one participant is a quiz bot and the other participant is a chat room creator is referred to as a quiz chat room. This chat room is not for general conversation or communication between the two participants but is for quiz-taking based on the quizbot 30. That is, a chat participant can create a one-to-one chat room by adding only the quizbot 30, take a quiz question provided by the quizbot 30, and input an answer to the quiz question. The group chat room is a chat room in which a plurality of chat participants and a quiz bot 30 can participate, and multiple participants compete in a quiz contest in conjunction with the quizbot 30.

Figure 9:
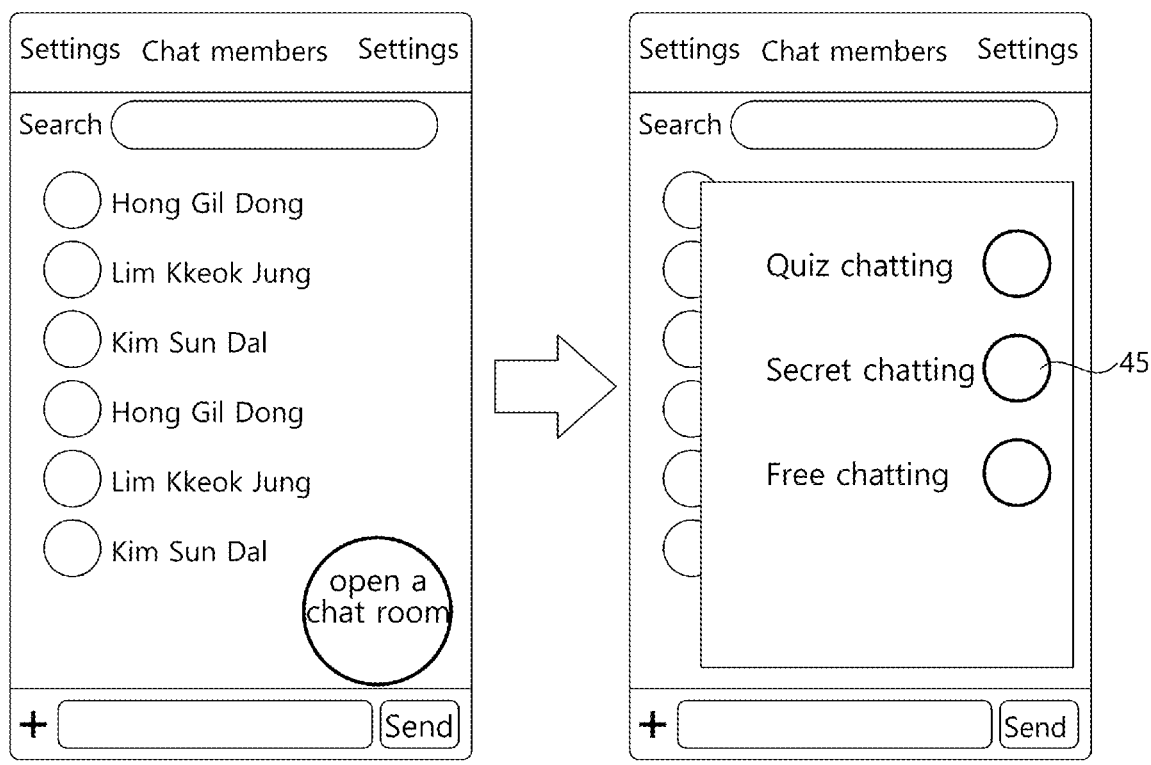
FIGS. 9 and 10 are views illustrating an example of a user interface layout to create a chat room, according to the present invention.
Figure 10:
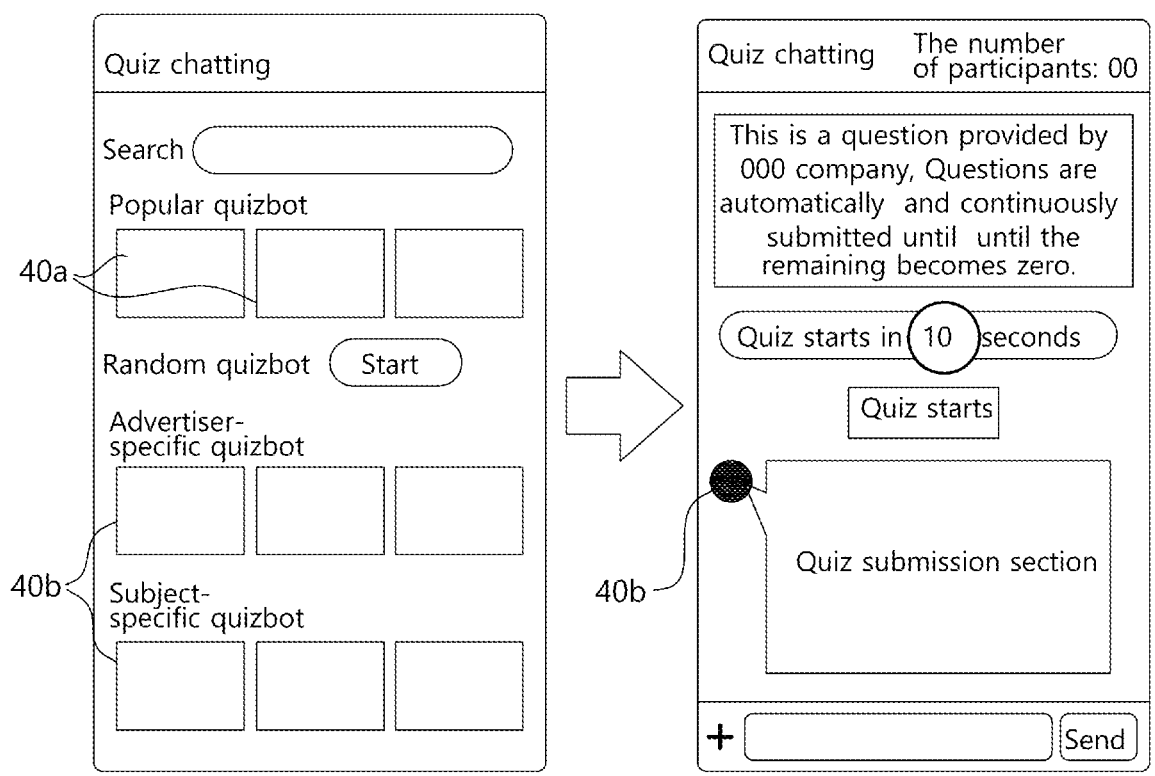

FIGS. 9 and 10 are diagrams illustrating an example of a user interface layout for creating a chat room, according to the present invention. As in the example of FIG. 9, a chat room creator can create a chat room by executing a messaging application program in his or her mobile terminal. To do this, a mobile terminal user can create various types of chat rooms by selecting members to participate in a specific chat room from a contact list and then clicking a "create a chat room" button. In the example of FIG. 9, a quiz chat room is a chat room in which chat participants solves quiz questions provided by the quizbot 30 participating in the chat room, a secret chat room is a chat room for secret conversation among chat participants, and a free chat room is a chat room for free chatting among chat participants.

To solve quizzes, a menu item "quiz chat" is selected from a messaging menu. When the menu item "quiz chat" is selected from the messaging menu, as in the example of FIG. 10, various quizbots 40*a* and 40*b* are displayed in a quizbot list so that a chat room creator can select a desired quizbot to be added to the chat room. Here, for example, when an advertisement quizbot 40*b* is selected, quiz questions provided by a selected advertiser are submitted to the chat room as illustrated in a right region of FIG. 10. In one example illustrated in the drawings, a plurality of quizbots for offering quiz questions in various categories is shown. For example, the quizbots are classified into popular quizbots, random quizbots, advertiser quizbots, topic-specific quizbots, and the like. The chat room creator may select one of the quizbots to provide quiz questions. When a quiz chat room is created, a quiz provider and how to solve a quiz is first briefed before starting quiz-taking, a quiz start time is then displayed, and the quiz-taking finally begins. A quiz-taking chat screen for taking a quiz is basically the same as a general conversation chat screen. However, when a quiz provider is selected, the words "quizbot provided by XX advertiser" are displayed on the quiz-taking cat screen.

The method of opening of a quiz chat room described above is merely an example. That is, chat rooms can be created in various ways. For example, a specific-purpose chat room (for example, a quiz chat room) is first opened a first chat participant, and other chat participants are invited to the quiz chat room to take a quiz. Alternatively, a general chat room for free chatting among chat participants is first opened, and the general chat room is then changed to a specific-purpose chat room (for example, quiz chat room) when the creator of the general chat room adds the quizbot 30 to the general chat room. Conversely, a specific-purpose chat room (for example, quiz chat room) for taking a quiz is first opened, and then the quiz chat room can be changed to a general chat room for free chatting by clicking a "stop quiz" button within the quiz chat room. In another embodiment, a quiz chat room is first opened. Free chatting among chat participants is forbidden within the quiz chat room, and only answering to quiz questions is allowed. In this case, it is also possible to set a chat room such that a specific character indicating an answer to a quiz is first automatically input by default when a chat participant prepares for inputting an answer to a quiz question. Of course, a multi-purpose chat room for both quiz-taking and free-chatting can be opened.

As described above, a chat room creator can determine whether or not to invite a quizbot to an existing chat room. When the chat room creator allows submission of a quiz to the existing chat room, a quizbot provides quiz questions to the chat room from the time at which the submission of a quiz to the chat room is allowed. The layout of a window for inputting basic personal information of a chat participant, which is used to set a quiz-taking procedure, a point earning rule, a quiz submission method, and a quiz question type, is similar to a quiz UI provided in a general chat room for free chatting.

Figure 11:
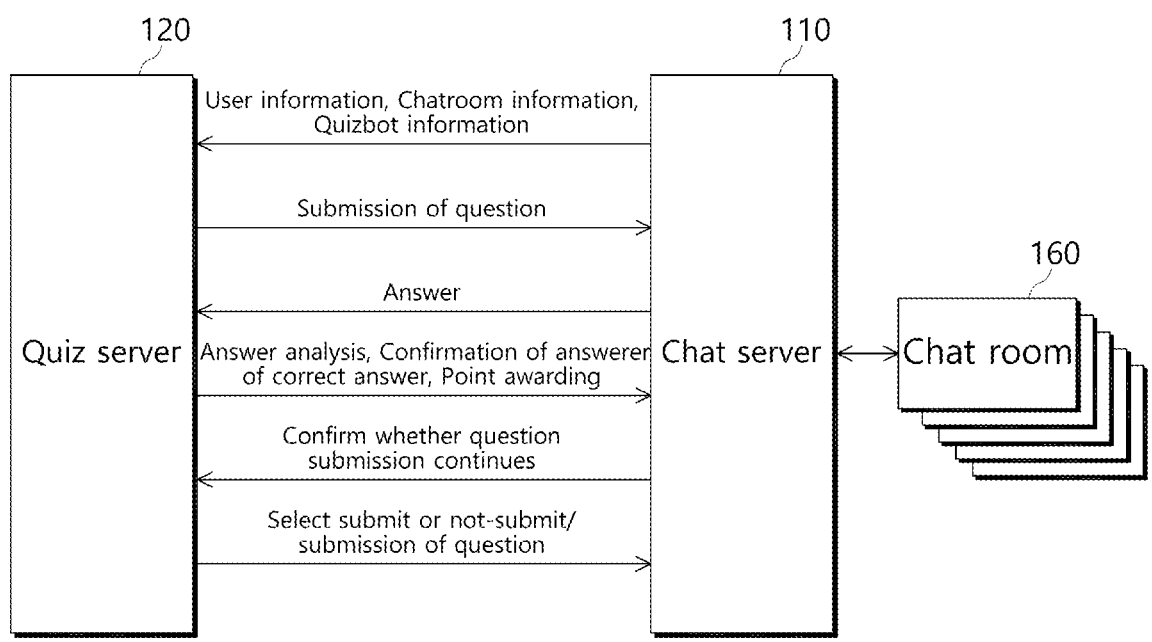
FIG. 11 is a diagram illustrating a process in which a quiz server performs information exchange with a chat server to provide a quiz and an advertisement to a chat room and to check whether or not an answer of a chat participant is correct, according to one embodiment of the present invention.

FIG. 11 is a diagram illustrating a process in which a quiz server performs information exchange with a chat server to provide a quiz and an advertisement to a chat room and to check whether or not an answer of a chat participant is a correct answer, according to one embodiment of the present invention. As illustrated in FIG. 11, the chat server 110 provides a plurality of chat rooms 160 at the request of a chat participant. When the quizbot 30 is added to one of the chat rooms 160 as a chat participant, the chat server 110 notifies the quiz server 120 that the quizbot 30 is added to the chat room 160. At this time, user information of the chat participants in the chat room 160, chat room information, and quizbot information are optionally provided to the quiz server 120. Next, customized quiz questions suitable for the chat participants, which are selected on the basis of a preset question type and a preset difficulty class, are provided to the chat server 110. Next, the chat participants in a quiz contest submit their answers to each quiz question by attaching a specific character (specific tag) to their answers. Referring to the quizbot information, chat participants can be aware of which quizbot of various quizbots is added to the chat room 160. For example, the quizbot information lets the chat participants know whether a current affairs quizbot that provides quiz questions about current affairs is added or a history quizbot that provides quiz questions about Korean history is added.

The quiz server 120 transmits the requested quiz and the customized advertisement to the chat server 110, and the chat server 110 causes the quizbot 30 to input the quiz and the advertisement into the chat room as a chat message. Here, the procedure in which the quizbot 30 inputs the quiz and the advertisement into the chat room 160 is controlled by the quiz server 120. For example, the quiz server 120 serves as a chat participant, thereby inputting quizzes, advertisements, general chat messages, and the like by using the quizbot 30.

When a quiz question is submitted by the quizbot 30 in a way described above, the other chat participants 10 and 20 input their answers to the quiz question in the chat room, and the chat server 110 transmits the answers to the quiz server 120. The quiz server 120 analyzes the answers to determine whether their answers are correct, and transmits the analysis result to the chat server 110. The chat server 110 identifies the user ID of the chat participant who has input a correct answer and awards promised points to the user ID. When the points are awarded to the user ID of the chat participants, the chat server 110 transmits the awarded points to the quiz server 120, and the quiz server 120 forwards the points to the point management server 150. The awarded points for each user account (user ID) accrue.

The chat server 110 then checks whether there is a submission request for a quiz question from the chat participant. When there is a submission request for a quiz question, the chat server 110 continues to submit a quiz question to the chat room according to the procedure described above.

Figure 12:
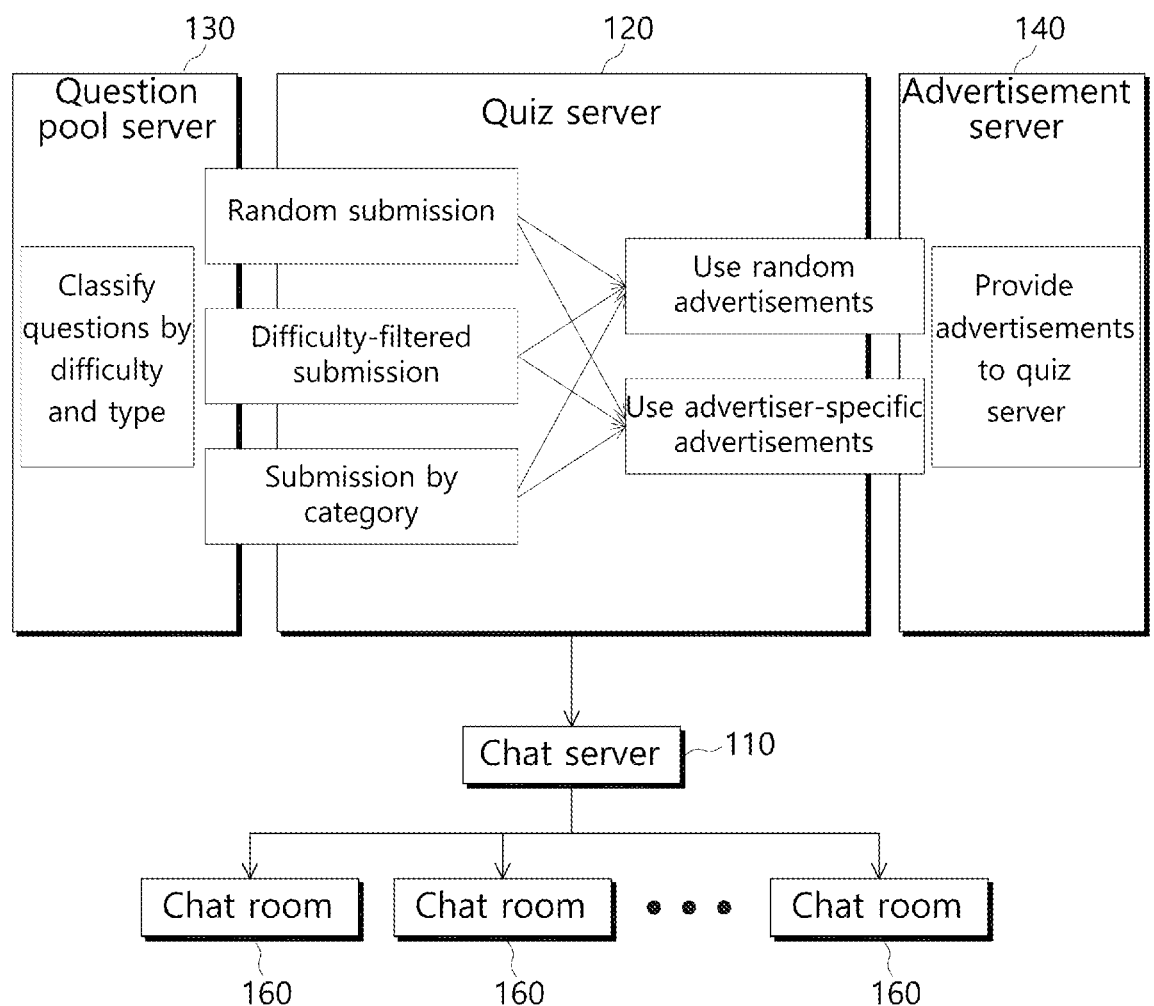
FIG. 12 is a diagram to describe a process in which the quiz server performs information exchange with a question pool server and an advertisement server, according to one embodiment of the present invention.

FIG. 12 is a diagram illustrating a process in which the quiz server performs information exchange with a question pool server and an advertisement server, according to one embodiment of the present invention. Referring to FIG. 12, the quiz server 120 according to the present invention makes a request to the question pool server for quiz questions tailored to the chat participants or for random quiz questions, and the question pool server 130 transmits the quiz questions according to the request to the quiz server 120. In addition, the quiz server 120 requests and receives advertisements from the advertisement server 140. In the present embodiment, when a chat participant selects a quiz provided by a specific advertiser, the quiz server 120 requests the advertisement server 140 to provide advertisements of the selected advertiser. Otherwise, the quiz server 120 makes a request for random advertisements. The advertisement server 140 has many advertisements registered by various advertisers in advance. When a request for an advertisement is received from the quiz server 120, the advertisement server 140 selects and transmits the requested advertisement to the quiz server 120.

The quiz server 120 combines the quiz question received from the question pool server 130 and the advertisement received from the advertisement server 140 and transmits them to the chat server 110. Next, the chat server 110 causes the quizbot 30 to input the quiz question and the advertisement in the form of chat messages in the chat room.

The question pool server 130 has many quiz questions classified by difficulty, question type, etc., and transmits some quiz questions selected in accordance with the request of the quiz server 120. The advertisement server 140 registers and stores points to be awarded to each of the chat participants who have answered correctly as well as have advertisements that are to be posted in a quiz chat room and which are classified by the advertiser. When a certain chat participant is awarded a preset number of points, the points are transferred to the point management server 150 so that the points accrue at the user account of the chat participant in the point management server 150.

Figure 13:
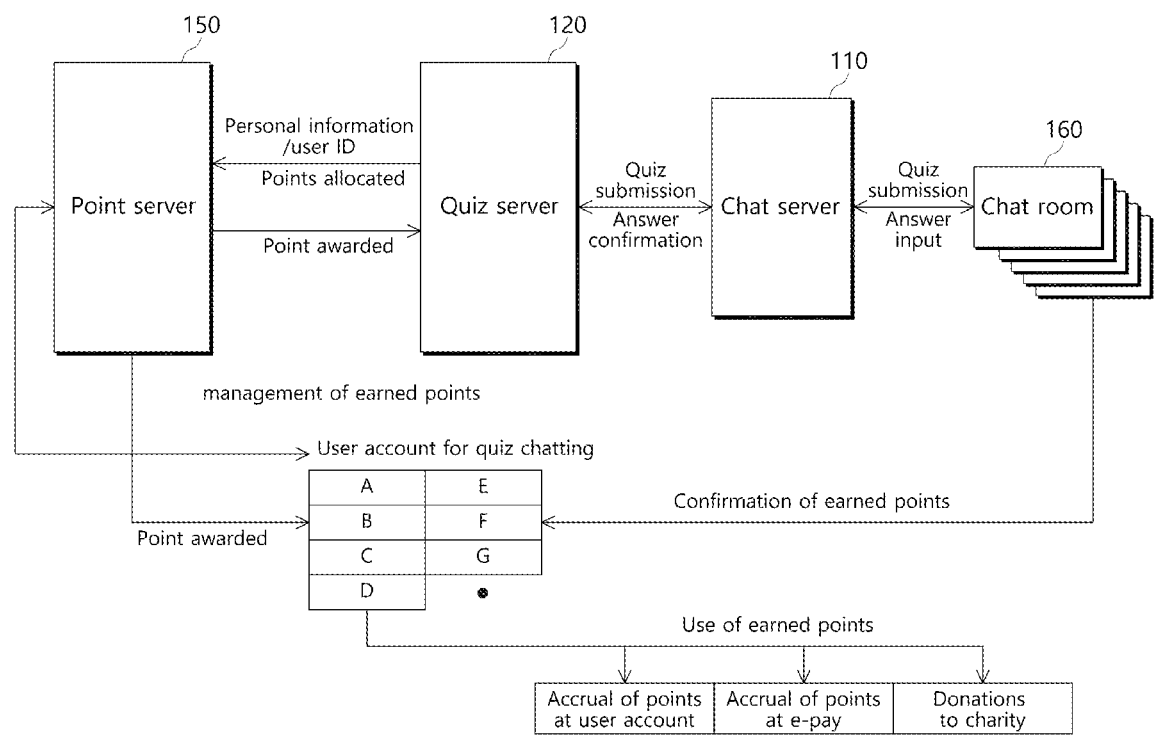
FIGS. 13 and 14 are diagrams to describe a point accumulation process performed by a point management server according to one embodiment of the present invention.
Figure 14:
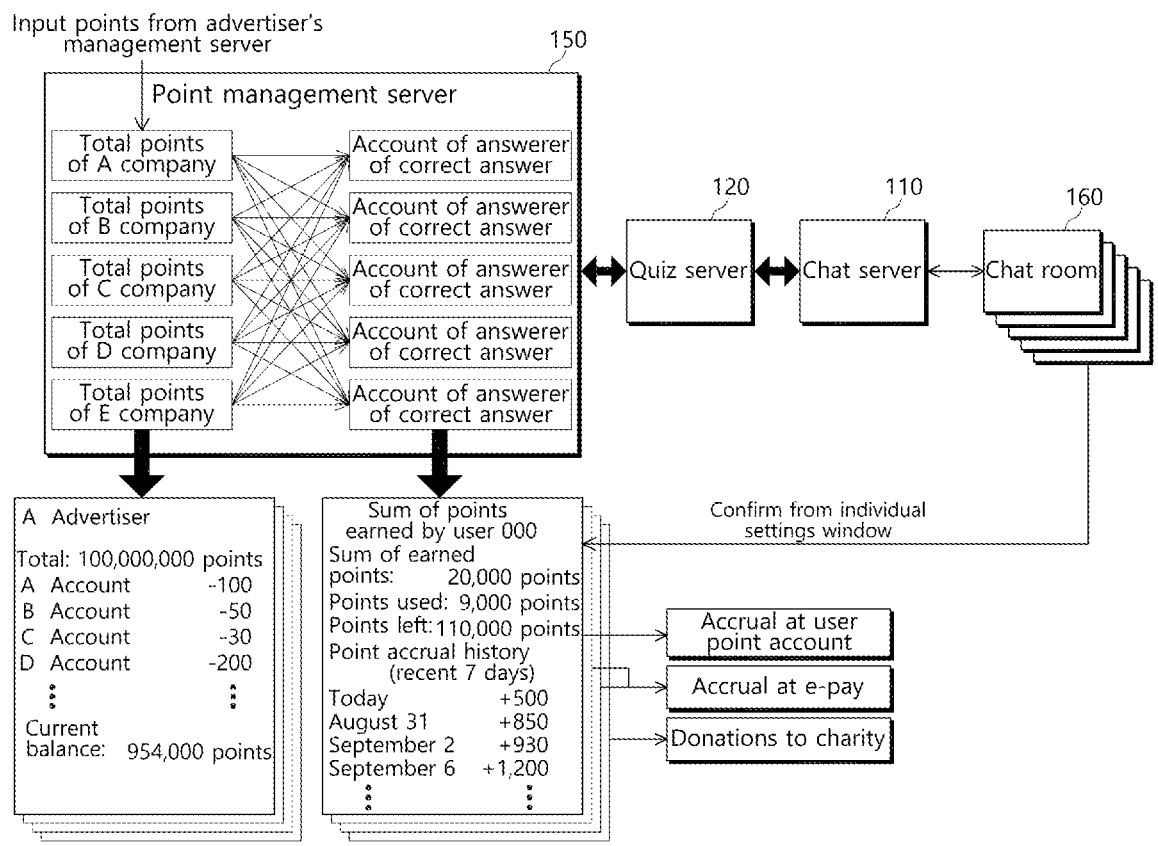

FIGS. 13 and 14 are diagrams illustrating a point accumulation process performed in the point management server according to one embodiment of the present invention. Referring to the example shown in the drawings, the point management server 150 generates user accounts of the respective chat participants to which the points provided by advertisers are credited, and manages the points on a per user account basis.

Advertisers who serve as quiz providers will provide their advertisements to the quiz server 120 in a state of having saved points which are saved in the quiz server 120 and are to be awarded to quiz participants who correctly answer to a quiz question. Each time an advertiser provides an advertisement or in a certain condition, the points awarded to the quiz participants are deducted from a total of points accumulated in the quiz server 120. When the points of the advertiser, saved in the quiz server 120, are completely deducted to become zero, no more advertisements of the advertiser can be provided to the quiz server.

That is, advertisers prepare their points by converting an amount of money corresponding to their advertising budgets or other promotional expenses for their products into the points. Thus, each quiz taker who submits a correct answer earns a varying number of points depending on the difficulty of each quiz, and the points earned by each quiz taker are credited to the account designated by the corresponding quiz taker.

Particularly, according to one embodiment of the present invention, when a chat participant submits a correct answer to a quiz question, preset points for the quiz question are credited to the user account and the same points are deducted from the points prepared by advertisers and saved in the quiz server 120. The point management server 150 manages the points of each chat participant as well as the points of each advertiser. The total of the points credited to the user account of each quiz taker can be checked at any time, and the accrued points can be redeemed when desired. In addition, the point management server can manage redemption history of the accrued points.

The quiz server 120 manages submission of quiz questions, identifies quiz takers who have correctly answered, and transmits the user information of the quiz tamers who have correctly answered. The point management server 150 awards a varying number of points to each quiz taker who has correctly answered depending on the difficulty of the quiz provided by the quiz server 120.

In order to accrue the points for each chat participant in the point management server 150, user accounts are generated for the respective user IDs of the chat participants so that the points awarded to each of the user IDs are credited to the corresponding user account. When the user information of the quiz participant who has correctly answered is received from the quiz server 120, the point management server 150 awards a predetermined number of points to the user account of the chat participant who has correctly answered and transmits a notification about the earned points to the quiz server 120. Thus, the chat participant who has correctly answered is notified of the earned points. In this case, these points are deducted from the points of the advertiser.

Regarding the points awarded to each chat participant who has correctly answered, point accrual history, the total of points, and the redeemed points can be confirmed. Regarding the management of the points of the advertisers, the point deduction history shows deduction transactions which are sorted by deduction time and user who is awarded the deducted points. When the current balance of the account of a certain advertiser becomes 0 point, it is notified to the advertisement server 140 so that the advertisements of the advertiser cannot be no longer transmitted to the quiz server 120.

In addition, according to the present invention, the point management sever 150 can transfer the points of each participant to an account of a different mileage card of the same individual. For example, the points can be transferred to an e-pay account. Thus, the accumulated points can be redeemed for a discount or a full payment for a purchase order of a product in an affiliated store of the mileage card, or redeemed for a donation to a charity associated with the point management server 150.

Each point of the points of the advertisers registered in the quiz server 120 may be worth a single won (KRW) which is the currency of South Korea. The advertiser may acquire the points with payment by using its advertising budge. The number of points awarded for solving each quiz question may vary depending on the difficulty of the quiz question. The advertiser may request the quiz server 120 to submit customized quiz questions by selecting a specific question type and/or a specific difficulty class to increase an advertising effect or a promotional effect.

Quizzes can be used for a specific purpose, for example, to disseminate information about a specific issue. For example, quizzes can be used for creating the awareness of notifications, administration affairs, or policies of the national government or local governments. In addition, when a survey agency carries out a survey or an opinion poll, a quiz talk may be used for more accurate poll.

Figure 15:
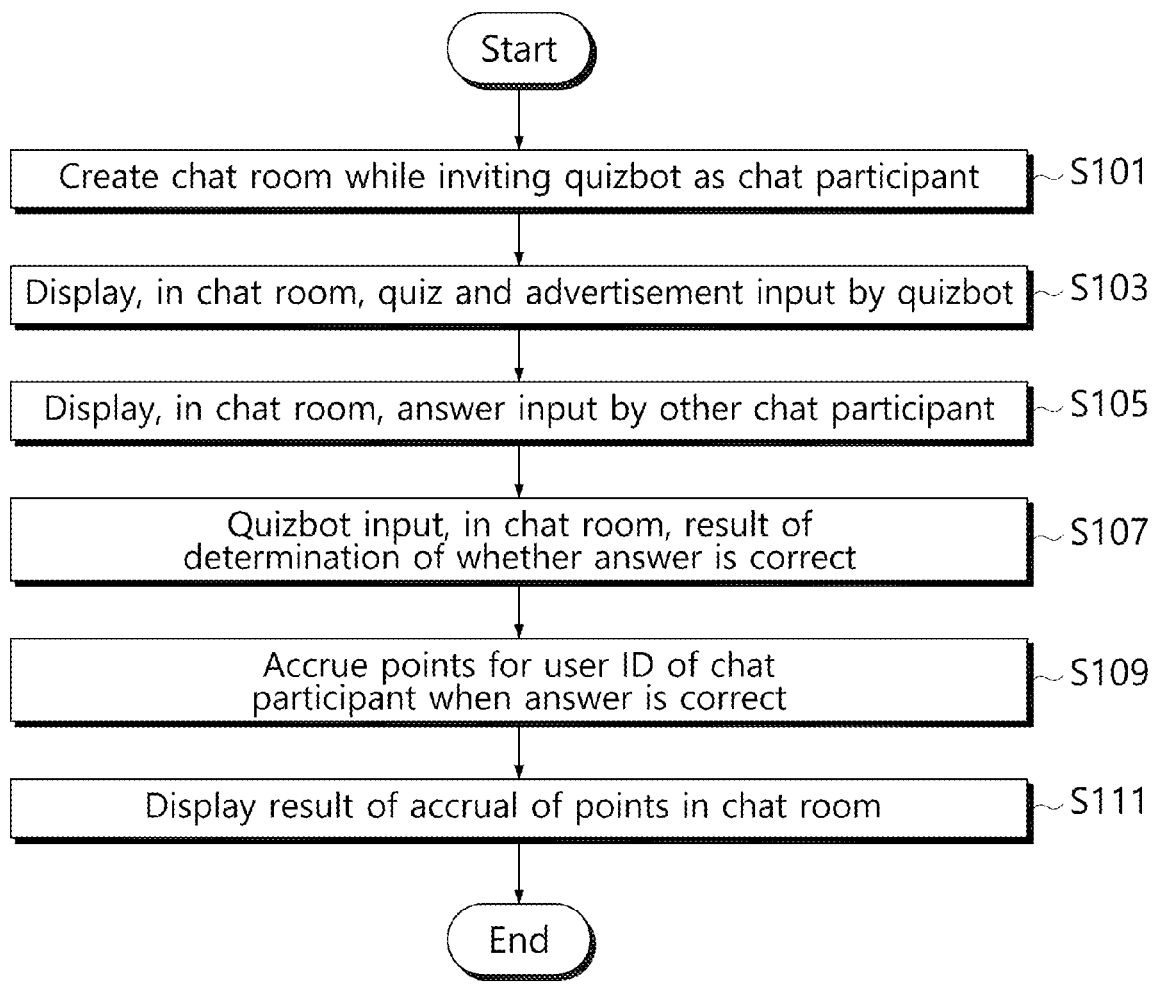
FIG. 15 is a flowchart illustrating a quiz and advertisement providing method using a chat room according to one embodiment of the present invention.

FIG. 15 is a flowchart illustrating a method of providing a quiz and an advertisement to a chat room, according to one embodiment of the present invention.

Referring to FIG. 15, the method of providing a quiz and an advertisement to a chat room, according to one embodiment of the present invention, includes Step S101 in which one chat participant creates a chat room while inviting a quizbot 30. The chat room is created by inviting one of a plurality of quizbots 30 pre-registered in a chat server 110. For example, a subscriber to an instant message service creates a one-to-one chat room in which the quizbot 30 and the subscriber are only the chat participants. Alternatively, a group chat room may be created for many chat participants.

As in the case described above, when the quizbot 30 is added to the chat room as one of the chat participants, or when a quiz question submission request is made by one of the chat participants after the quizbot 30 is added to the chat room, quiz questions and advertisements are input one after another by the quizbot 30 so that the quizzes and the advertisements are displayed in the chat room at regular time intervals (Step S103). When the chat server 110 notifies a quiz server 120 that the quizbot 30 is added to the chat room, the quiz server 120 makes a request for a quiz and an advertisement with respect to a question pool server 130 and an advertisement server 140, respectively and receives a quiz and an advertisement from the question pool server 130 and the advertisement server 140, respectively. The quiz and advertisement are input into the chat room by the quizbot 30. In this case, the chat server 110 may provide the quiz server 120 with user information of the chat participants such as age, hobby, area of concerns, etc. so that customized quizzes suitable for the chat participants can be provided.

Next, answers (responses) of the chat participants other than the quizbot are displayed in the chat room (Step S105). Next, the quiz server 120 receives the answers from the chat server 110, determines whether or not the answers are correct, and transmits the determination result to the chat server 110. Next, in the chat server 110, the quizbot 30 inputs the determination results into the chat room as a chat message (Step S107). At this time, a chat message for notifying that each of the chat participants who have submitted a correct answer is awarded a preset number of points that varies depending on answer types of quizzes (for example, multiple choice or short answer/essay), question types, and question categories.

Thereafter, the chat server 110 transmits the user IDs of the chat participants who have submitted the correct answer to the quiz server 120, and the point sever 150 updates the points of the chat participants having the respective user IDs so that the newly awarded points are accrued (Step S109). Next, the result of the accrual of the points for each user ID is displayed in the chat room (Step S111).

Figure 16:
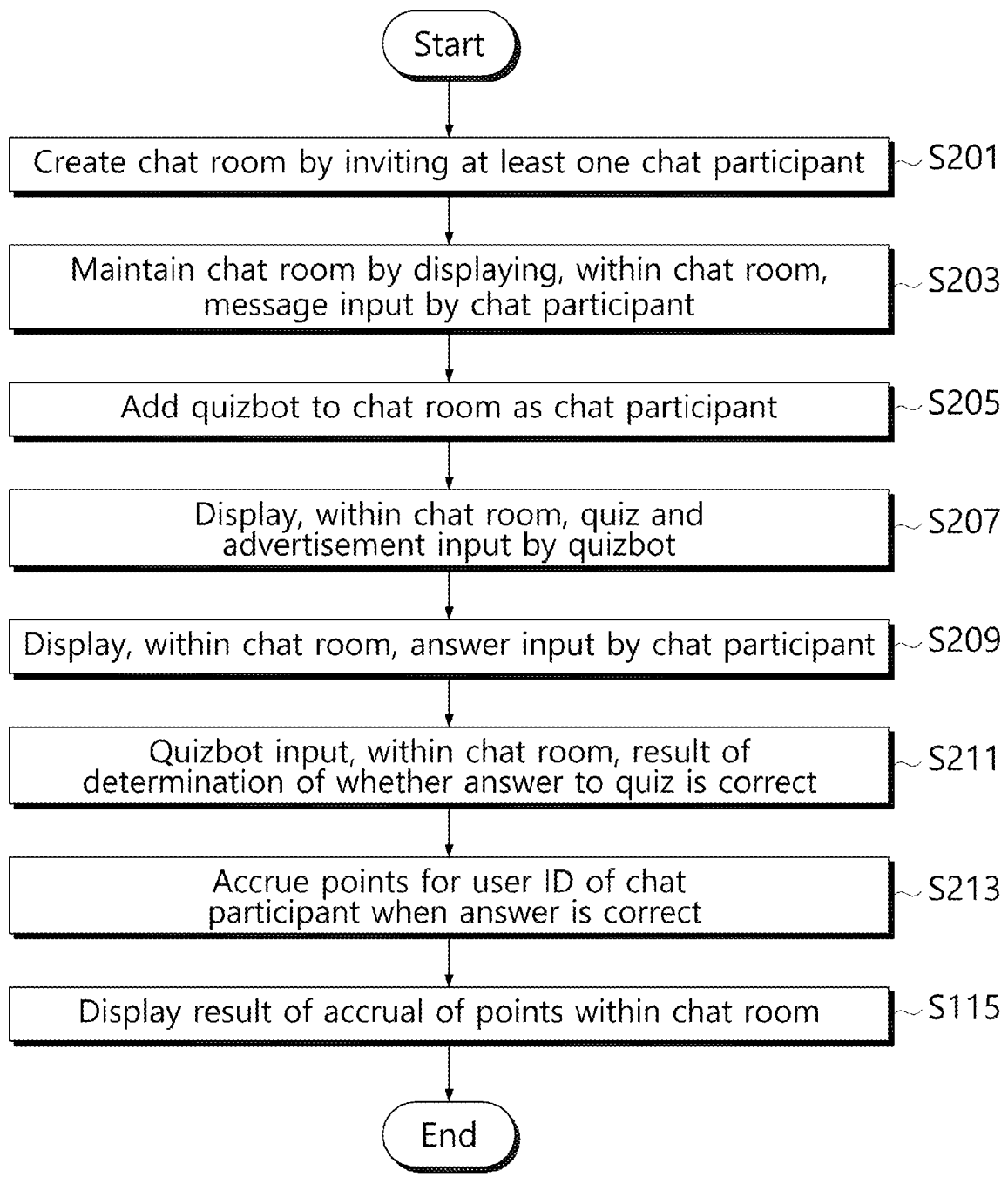
FIG. 16 is a flowchart illustrating a quiz and advertisement providing method using a chat room according to another embodiment of the present invention.

FIG. 16 is a flowchart illustrating a method of providing a quiz and an advertisement to participants in a chat room, according to another embodiment of the present invention.

Referring to FIG. 16, the quiz and advertisement providing method according to the present embodiment of the present invention includes a step of creating a chat room by inviting at least one chat participant to the chat room (Step S201) and a step of maintaining the chat room by displaying chat messages input by many chat participants in the chat room (Step S203).

Next, a quizbot 30 is added to the chat room as a chat participant (Step S205). This is a method of adding one of a plurality of quizbots 30 to the chat room as a chat participant after the chat room has already been created. This embodiment allows a group of chat participants in a group chat room to take a quiz provided by the quizbot 30.

The quizbot 30 inputs a quiz and an advertisement into the group chat room so that the quiz and the advertisement appear as chat messages in the group chat room (Step S207) when the quizbot 30 is added to the group chat room as a chat participant or when a quiz question submission request is input after the quizbot 30 is added to the group chat room. When a chat server 110 notifies a quiz server 120 that the quizbot 30 is added to the chat room, the quiz server 120 makes a request for a quiz and an advertisement with respect to a question pool server 130 and an advertisement server 140, respectively, thereby receiving the quiz and the advertisement from the question pool server 130 and the advertisement server 140, respectively and then commanding the quizbot 30 to input the quiz and the advertisement into the chat room. In this case, the chat server 110 may provide the quiz server 120 with the ages, hobbies, areas of concern, etc. of the chat participants so that customized quizzes suitable for the chat participants can be provided to the chat participants.

Next, answers (responses) of the chat participants other than the quizbot appear in the chat room (Step S209). Next, the quiz server 120 receives the answers from the chat server 110, determines whether or not the answers are correct, and transmits the determination result to the chat server 110. Next, in the chat server 110, the quizbot 30 inputs the determination results as a chat message into the chat room (Step S211). At this time, a chat message for notifying that each of the chat participants who have submitted the correct answers are awarded a preset number of points that varies depending on answer types of quizzes (for example, multiple-choice questions or short-answer/essay questions), question types, and question categories.

Thereafter, the chat server 110 transmits the user IDs of the chat participants who have submitted the correct answers to the quiz server 120, and the point server 150 updates the user accounts of the chat participants corresponding to the user IDs so that the accrual of the awarded points is performed (Step S213). Next, the result of the accrual of the points for each user ID is displayed in the chat room (Step S215).

Figure 17:
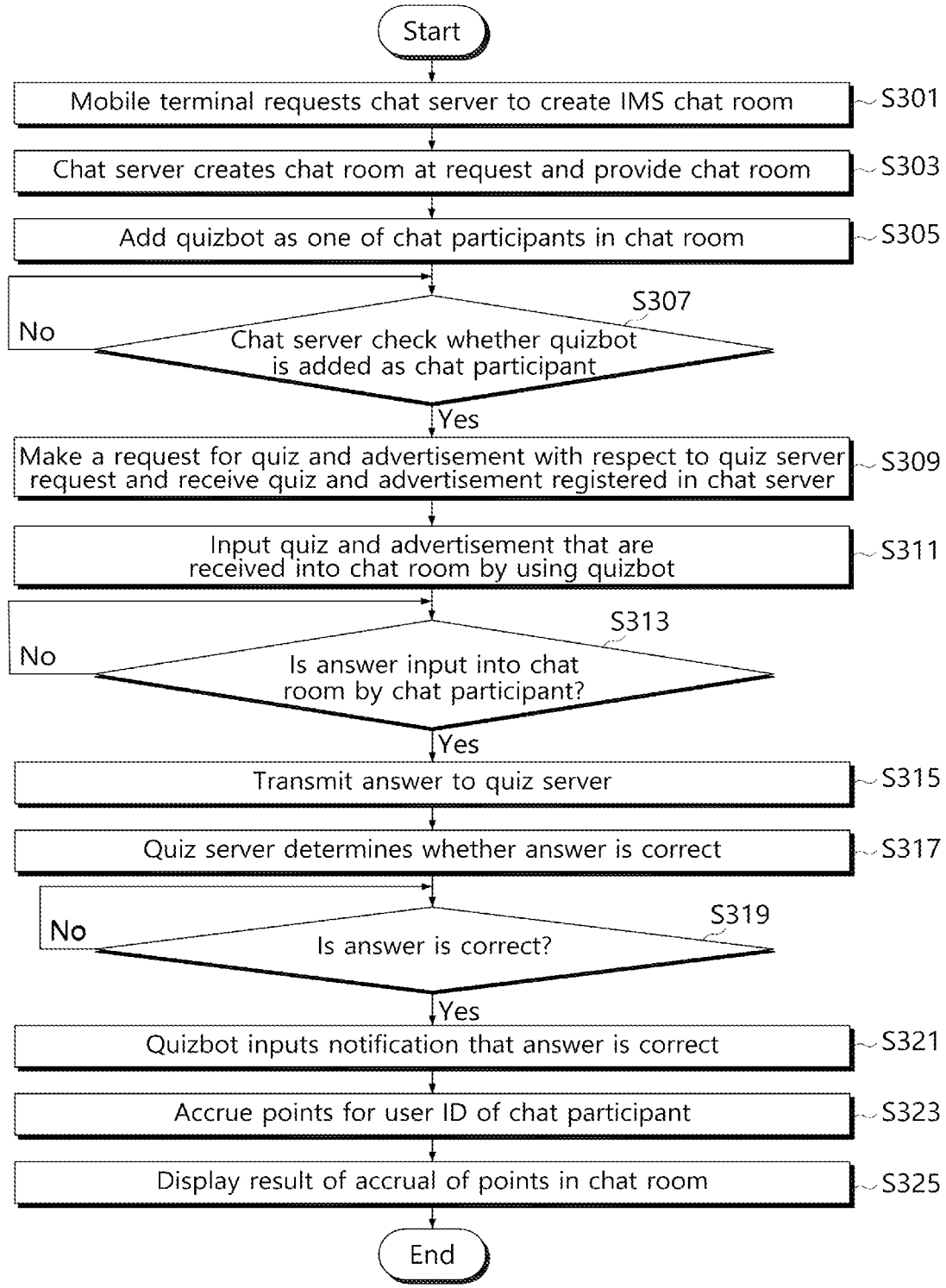
FIG. 17 is a flowchart illustrating a quiz and advertisement providing method using a chat room according to a further embodiment of the present invention.

FIG. 17 is a flowchart illustrating a quiz and advertisement provision method using a chat room according to a further embodiment of the present invention.

Referring to FIG. 17, according to the present invention, when a mobile terminal requests a chat server 110 to create an IMS chat room (Step S301), the chat server 110 creates a chat room according to the request and provides it to the mobile terminal (Step S303). Next, a quizbot 30 is added to the chat room created in the way described above as one of the chat participants (Step S305). The participation of the quizbot 30 in the chat room may be implemented in a single stage of creating a chat room in which the quizbot 30 is the first-joined chat participant or in two stages: creating a chat room in the first stage and adding the quizbot 30 to the chat room in the second stage.

Next, the chat server 110 checks whether or not the quizbot 30 has been added to the chat room as a chat participant (Step S307). When it is determined that the quizbot 30 is added to the chat room, the chat server 110 notifies a quiz server 120 of the addition of the quizbot 30 to the chat room, makes a request for a quiz and an advertisement, and receives the quiz and the advertisement (Step S309). That is, the chat server 110 notifies the quiz server 120 that the quizbot 30 has been added to the chat room, and the quiz server 120 subsequently makes a request for a quiz and a request for an advertisement with respect to a question pool server 130 and an advertisement server 140, respectively, receives the quiz and the advertisement from the question pool server 130 and the advertisement server 140, respectively, and forwards the quiz and the advertisement to the chat server 110. The chat server 110 causes the quizbot 30 to input the received quiz and the received advertisement in the form of chat messages into the chat room (Step S311).

Next, the chat server 110 checks whether there is an answer to the quiz question, which is input by one of the chart participants, in the chat room (Step S313). In this case, the chat server 110 can discern a chat message which is input as an answer to a quiz question from a chat message which is input as a free-chatting response, by identifying a specific character contained in each chat message. For example, out of many chat messages, a chat message with the character "@" positioned at the head or the tail of the chat message is not regarded as a general free-chatting message but is regarded as an answer to a quiz.

When it is determined that at least one chat participant other than the quizbot has submitted an answer to the quiz question, the chat server 110 transmits the answer input by the chat participant to the quiz server 120 (Step S315), and the quiz server 120 determines whether or not the answer is correct (Step S317). In Step S315, the answers and the user IDs of the respective chat participants who submitted the answers are transmitted to the quiz server 120. This step is performed to identify the chat participants who submitted the answers.

When the answers are correct (Step S319), a notification that the answers are correct is input as a chat message by the quizbot 30 (Step S321). When there are multiple participants who have submitted the correct answers, they will be individually notified of the fact that their answer is correct.

Next, the quiz server 120 requests the point management server 150 to award a preset number of points to the user IDs of the chat participants who have submitted the correct answers. The point management server 150 updates the accounts of the user IDs so that the points of the user IDs are accrued (Step S323). Next, the quizbot 30 inputs a chat message notifying of the total of accumulated points into the chat room (Step S325).

As described above, in the system and method of providing a quiz and an advertisement simultaneously in a chatting room according to the present invention, the quizbot is added to a chat room such that the quizbot can input the quiz and the advertisement as chat messages into the chat room. This allows other chat participants in the chat room to take the quiz while being exposed to the advertisement. In addition, since a preset number of points is awarded to each of the chat participants who have answered correctly and the accrual of the points for each user ID is performed. Therefore, the system and method according to the present invention can encourage the chat participants to actively participate in taking the quiz by making the chat participants entertained through the quiz taking.

According to the present invention, the chat room creator determines whether or not to invite the quizbot to the chat room so that quizzes can be provided to the existing chat room. In addition, when the participation of the quizbot in the chat room is affirmatively determined by the chat room creator, the quizbot provides quiz questions one after another to the chat room until the chat room is closed. The quiz question type is determined according to the difficulty, category, etc. of the quiz. Quizzes can be classified into a speed quiz type and a time quiz type according to a question submission method. The speed quiz refers to a quiz in which the first answerer of the correct answer among the chat participants in the chat room wins the quiz. On the other hand, the timed quiz refers to a quiz in which all of the chat participants are allowed to submit their answers within a preset period of time and all the answerers of the correct answer win the quiz.

In addition, the quiz is designed such that quiz questions are random in difficulty by default. Alternatively, the quiz questions are graded by difficulty and a set of quiz questions having a preset difficulty level may be provided to the quiz participants. The quiz participants can choose from several options for question types, difficulty levels, or categories. That is, a participant-centered quiz submission is possible. The quiz server may receive quiz participants' basic personal information such as age and gender from the chat server, determine the type, difficulty, and category of a quiz on the basis of the basic personal information of the quiz participants, and provide quiz questions selected according to the determined type, difficulty, and category.

In the present invention, the quiz questions are provided at regular time intervals, and the entity which provides the quiz questions is preferably an advertiser registered in the quiz server. This is because the advertiser can maximize the advertising effect by providing its advertisement along with the quiz. For this purpose, the advertiser converts the amount of an advertising budget into an equivalent number of points, registers the equivalent number of points in the quiz server, and awards a preset number of points to each of the chat participants who have submitted the correct answers. In this case, the points awarded to each of the quiz participants in all of the chat rooms created by the chat server are totaled and the sum of the awarded points is deducted from the account of the advertiser. When the awarded points are deducted and the current point balance of the advertiser becomes zero, the advertising activity of the quiz provider for the adviser having the current balance of zero point is terminated and only the advertisements of the advisers with points left are provided to the quiz chat rooms.

Each of the quiz answerers of the correct answer earns a preset number of points that vary depending on the difficulty of the quiz and which are provided by the advertiser, and the earned points are accumulated at a place designated by a corresponding one of the quiz answerers of the correct answer. The point management server 150 operates in conjunction with the quiz server 120 for the accrual and management of the points of the advertisers and the points of the chat participants.

Each of the answers to a quiz is transmitted along with a specific character (including a symbol) which is attached to the head or the tail of an answer to facilitate identification of the answers to the quiz.

When a quiz participant uses a certain position information-based service, quiz questions that are selected on the basis of position information of chain stores, commercial agents, or the like of the advertiser are provided to the quiz participants. When a chat participant moves around and arrives at the vicinity of a commercial agent or a chain store of the advertiser for which the quizbot 30 provides advertisements to chat rooms, a quiz and an advertisement associated with the nearby commercial agent or chain store of the advertiser are provided to the chat rooms.

When a quiz participant is not willing to solve the quiz provided by the advertiser, the quiz participant can decline the quiz provided to the chat room. The quiz can be declined on a per question basis. Once a quiz question is declined, the chat participant in the chat room may be either automatically provided with the next quiz question, or may challenge the declined quiz question again. When at least any one of the chat participants in the chat room successfully solves a quiz question, all of the chat participants in the chat room are forbidden to challenge the same quiz question again.

Thanks to the features of the present invention, advertisers can maximize a marketing effect because they can continuously, repeatedly, selectively, and aggressively perform promotion for their products, companies, company images, and brands, thereby increasing the awareness of the products, the companies, the company images, and the brands thereof by using an effective advertising and promotion method using a newly designed chat room service different from a conventional chat room service in which chat participants are not effectively exposed to advertisements of the advertisers. In addition, the chat room creator and the chat participants can use a chat room which has been conventionally a tedious space as a fun, entertaining, and educational space. Thus, the present invention changes a conventional time-consuming chat room service to a productive chat room service while maintaining a general messaging function.

In addition, the points rewarded for solving quizzes can be used in conjunction with a mileage card or an E-pay service. Alternatively, the points can be redeemed for online donations to a charity. Thus, people can easily participate in social activities through donations in an easy and convenient way, thereby benefiting our society, resulting in a social virtuous circle.

The chat room according to the present invention can build a new profit model for the operator of the qui server and an online to offline (O2O) service model, can expand the franchise, and can be utilized as a variety of tools by operating in conjunction with existing contents. For example, it can be used for financial services associated with the E-pay, promotional activities for companies, products, administration affairs of the national government, surveying/polling, and collection and utilization of analytical data (collection of big data) based on the information provided by quiz participants.

While the present invention has been described such that all the components constituting one embodiment are combined together or operate in conjunction with each other, it is to be understood that the present invention is not limited to the disclosed embodiments. That is, all of the components may be selectively combined or may operate selectively in conjunction with one another without departing from the scope of the present invention. It will be further understood that the terms "comprise" and/or "comprising", or "includes" and/or "including", or "has" and/or "having" when used in this specification, specify the presence of stated elements and/or components, but do not preclude the presence or addition of one or more elements, components and/or groups thereof. All terms, including technical and scientific terms, have the same meaning as commonly understood by those skilled in the art to which this invention belongs, unless otherwise defined. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The embodiments that have been described herein above are merely illustrative of the technical idea of the present invention, and thus various modifications, changes, alterations, substitutions, subtractions, and additions may also be made by those skilled in the art without departing from the gist of the present invention. The embodiments disclosed in the present disclosure are not intended to limit the scope of the present invention and the technical spirit of the present invention should not be construed as being limited to the embodiments. The protection scope of the present invention should be construed as defined in the following claims, and it is apparent that all technical ideas equivalent thereto fall within the scope of the present invention.

The invention claimed is:

1. A method of providing a quiz and an advertisement simultaneously in an instant message service (IMS) chat room, the method comprising:
   a registration step in which a quiz server registers a quizbot as a chat participant such that the quizbot provides the quiz and the advertisement in the IMS chat room;
   a creation step in which the IMS chat room- is created from a mobile terminal by adding the quizbot as one of chat participants;
   a first transmission step in which a chat server transfers information of the chat participants in the IMS chat room to the quiz server when the quizbot is added to the IMS chat room or when a quiz question submission request is input by one of the chat participants after the quizbot is added to the IMS chat room;
   a first request step in which the information of the chat participants is transferred from the quiz server to a question pool server and a request for quiz information corresponding to the information of the chat participants is made;
   a second transfer step in which the question pool server extracts the quiz information corresponding to the information of the chat participants and transfers the extracted quiz information to the quiz server;
   a second request step in which when the quiz server receives the quiz information from the question pool server, the quiz server transfers the information of the chat participants and the received quiz information to an advertisement server and sends a request for advertisement information corresponding to the information of the chat participants and the quiz information to the advertisement server;
   a third transfer step in which the advertisement server extracts the advertisement information corresponding to the information of the chat participants and the quiz information and transmits the extracted advertisement information to the quiz server;
   a fourth transfer step in which the quiz server transfers the received quiz information and the received advertisement information to the chat server;
   a first display step in which the chat server displays the received quiz information and the received advertisement information as a chat message composed by the quizbot;
   a second display step in which answers input by the chat participants from the mobile terminal appear in the IMS chat room; and
   an input step in which the chat server receives, from the quiz server, a result of determination of whether the answers input into the IMS chat room is correct, and the result of the determination is input as another chat message composed by the quizbot.

2. The method according to claim 1, wherein the IMS chat room is a one-to-one chat room having only two participants including a first chat participant who is a mobile terminal user and a second chat participant who is the quizbot, or a group chat room having three or more participants including a first chat participant who is a mobile terminal user, a second chat participant who is the quizbot, and a third chat participant who is not specifically defined.

3. The method according to claim 1, wherein the quiz server provides a hint in the form of a chat message in the IMS chat room when no answer to a quiz is input by any chat participant within a predetermined time limit, or when no correct answer is found among answers input by a predetermined ratio or more of the chat participants within the predetermined time limit, after the quiz is submitted to the IMS chat room by the quizbot.

4. The method according to claim 1, wherein at least one piece of the quiz information including a question type, a difficulty class, a rating, a category, and a time limit for each quiz to be input by the quizbot is selected from the mobile terminal.

5. The method according to claim 1, wherein the quizbot inputs quizzes and advertisements into the IMS chat room at predetermined time intervals.

6. The method according to claim 1, wherein the second display step comprises:
   a first input step in which answers of the chat participants with respect to the quiz are input from the respective mobile terminals;
   a transmission step in which the chat server transmits the answers to the quiz server;
   a checking step in which the quiz server checks whether or not the answers are correct; and
   a second input step in which the quizbot inputs, into the IMS chat room, a message notifying of accrual of points awarded to each of user IDs of the respective chat participants who have submitted correct answers.

7. The method according to claim 6, wherein, in the transmission step, the chat server determines each of chat messages input by the chat participants from the respective mobile terminals as an answer to the quiz when each of the chat messages input by the chat participants contains a predetermined character, and transmits the chat messages containing the predetermined character to the quiz server.

8. The method according to claim 6, further comprising a point display step performed after the input step, wherein in the point display step, a predetermined number of points newly awarded for solving a current quiz and a total of the points accumulated are displayed in a chat message form or in a popup window form.

9. A method of providing a quiz and an advertisement simultaneously in an instant message service (IMS) chat room, the method comprising:
- a registration step in which a quiz server registers a quizbot as a chat participant to provide the quiz and the advertisement simultaneously in the IMS chat room by using the quizbot;
- a creation step in which the IMS chat room is created from a mobile terminal by adding chat participants to the IMS chat room;
- a maintaining step of maintaining the IMS chat room by displaying, in the IMS chat room on the mobile terminal, chat messages input by each of the chat participants;
- an addition step in which the registered quizbot is added to the IMS chat room as a chat participant from the mobile terminal;
- a first transfer step in which information of the chat participants in the IMS chat room is transferred to the quiz server when the quizbot is added to the IMS chat room or when a quiz question submission request is input by one of the chat participants after the quizbot is added to the IMS chat room;
- a first request step in which the information of the chat participants is transferred from the quiz server to a question pool server and a request for quiz information corresponding to the information of the chat participants is made;
- a second transfer step in which the question pool server extracts the quiz information corresponding to the information of the chat participants and transfers the extracted quiz information to the quiz server;
- a second request step in which when the quiz server receives the quiz information from the question pool server, the quiz server transfers the information of the chat participants and the received quiz information to an advertisement server and sends a request for advertisement information corresponding to the information of the chat participants and the quiz information to the advertisement server;
- a third transfer step in which the advertisement server extracts the advertisement information corresponding to the information of the chat participants and the quiz information and transmits the extracted advertisement information to the quiz server;
- a fourth transfer step in which the quiz server transfers the received quiz information and the received advertisement information to the IMS chat server;
- a first display step in which the chat server displays, in the chat room, the received quiz information and the received advertisement information as a chat message composed by the quizbot;
- a second display step in which answers input by the chat participants from the respective mobile terminals appear in the IMS chat room; and
- an input step in which the chat server receives, from the quiz server, a result of determination of whether the answer input into the IMS chat room is correct, and the quizbot inputs the result of the determination as another chat message.

10. The method according to claim 9, wherein the IMS chat room is a one-to-one chat room having only two participants including a first chat participant who is a mobile terminal user and a second chat participant who is the quizbot, or a group chat room having three or more participants including a first chat participant who is a mobile terminal user, a second chat participant who is the quizbot, and a third chat participant who is not specifically defined.

11. The method according to claim 9, wherein at least one piece of the quiz information including a question type, a difficulty class, a rating, a category, and a time limit for each quiz to be input by the quizbot is selected from the mobile terminal.

12. The method according to claim 9, wherein the quizbot inputs quizzes and advertisements into the IMS chat room at predetermined time intervals.

13. The method according to claim 9, wherein the second display step comprises:
- a first input step in which answers of the chat participants with respect to the quiz are input from the respective mobile terminals;
- a transmission step in which the chat server transmits the answers to the quiz server;
- a checking step in which the quiz server checks whether or not the answers are correct; and
- a second input step in which the quizbot inputs, into the IMS chat room, a message notifying of accrual of points awarded to each of user IDs of the respective chat participants who have submitted correct answers.

14. A method of providing a quiz and an advertisement simultaneously in an instant message service (IMS) chat room, the method comprising:
- a registration step in which a quiz server registers a quizbot as a chat participant to provide the quiz and the advertisement simultaneously in the IMS chat room by using the quizbot;
- a provision step in which the chat server creates the IMS chat room at a request of a mobile terminal and provides the IMS chat room to the mobile terminal;
- an addition step in which the mobile terminal adds the registered quizbot as one of chat participants of the IMS chat room;
- a first transfer step in which the chat server transfers information of the chat participants of the IMS chat room to the quiz server when the quizbot is added as one of the chat participants by the chat server or when a quiz question submission request is input by one of the chat participants after the quizbot is added to the IMS chat room as one of the chat participants;
- a first request step in which the information of the chat participants is transferred from the quiz server to a question pool server, and a request for quiz information corresponding to the information of the chat participants is made by the quiz server;
- a second transfer step in which the question pool server extracts the quiz information corresponding to the information of the chat participants and transfers the extracted quiz information to the quiz server;
- a second request step in which when the quiz server receives the quiz information from the question pool server, the quiz server transfers the information of the chat participants and the received quiz information to an advertisement server and makes a request for advertisement information corresponding to the information of the chat participants and the quiz information with respect to the advertisement server;
- a first transmission step in which the advertisement server extracts the advertisement information corresponding to the information of the chat participants and the quiz information and transmits the extracted advertisement information to the quiz server;

a third transfer step in which the quiz server transfers the quiz information and the advertisement information to the IMS chat server;

a first display step in which the chat server displays, in the IMS chat room, the received quiz information and the received advertisement information as a chat message composed by the quizbot;

a second display step in which answers input by the respective chat participants are displayed in the IMS chat room on the mobile terminal;

a second transmission step in which the answers input by the respective chat participants are transmitted to the quiz server from the chat server;

a third transmission step in which the quiz server transmits a result of determination of whether each of the answers with respect to the quiz information is correct, to the chat server; and an input step in which the chat server receives, from the quiz server, the result of the determination of whether the answers to the quiz information are correct, and causes the quizbot to input the result of the determination as another chat message.

15. The method according to claim 14, wherein the question pool server has a quiz database in which a plurality of quiz questions classified by question type, difficulty, ranking, and category are stored, the advertisement server has an advertisement database in which advertisements classified by advertiser are registered and stored, and the question pool server and the advertisement server transmit the quiz and the advertisement, respectively, to the quiz server at a request of the quiz server for the quiz and a request of the quiz server for the advertisement, respectively.

16. The method according to claim 14, wherein, from the mobile terminal, one of the chat participants of the chat room selects at least one piece of the quiz information including a question type, a difficulty, a ranking, and a category of the quiz to be input by the quizbot.

17. The method according to claim 14, wherein the quiz server causes the quizbot to provide a hint for the quiz in the form of a chat message in the IMS chat room when no answer to the quiz is submitted, or when no correct answer is found among the answers input by a predetermined ratio or more of the chat participants, within a preset time limit after the quiz is submitted by the quizbot.

18. The method according to claim 14, wherein the second transmission step comprises:
determining, by the chat server, whether a predetermined character which is set by one of the chat participants is contained in a chat message; and
determining, by the chat server, the chat message containing the predetermined character as an answer to the quiz, and transmitting the chat message determined as the answer, to the quiz server.

19. The method according to claim 18, wherein the input step comprises:
determining, by the quiz server, whether the answer is correct;
transmitting, by the quiz server, a result of the determination to the chat server; and
commanding, by the chat server, the quizbot to input the result of the determination in the form of a chat message into the chat room.

20. The method according to claim 18, wherein after the input step, the following is performed:
transmitting, by the quiz server, a user ID of a chat participant who correctly answered and the number of points awarded to the chat participant for solving the quiz to the point server when the answer of the chat participant is determined to be a correct answer;
accruing, by the point server, the points awarded to the user ID and transmitting a result of the accrual of the points to the quiz server;
transmitting, by the quiz server, the result of the accrual of the points for the user ID to the chat server; and
commanding, by the chat server, the quizbot to input the result of the accrual of the points for the user ID into the IMS chat room in the form of a chat message.

21. The method according to claim 20, after the commanding, by the chat server, the quizbot to input the result of the accrual of the points into the IMS chat room, the following is performed:
allowing the accrued points to be used in a predetermined way at a point use request input from the mobile terminal in a state in which the points are accrued for the user ID.

22. A system for providing a quiz and an advertisement simultaneously as a chat message in an instant message service (IMS) chat room, the system comprising:
a chat server, in order to provide the quiz and the advertisement simultaneously in the IMS chat room by using a quizbot, configured to register the quizbot as a chat participant, to create and provide the IMS chat room to a mobile terminal at a request of the mobile terminal, to maintain the IMS chat room by displaying, within the IMS chat room, chat messages input by each of chat participants, to transmit information of the chat participants of the IMS chat room when the quizbot is added to the IMS chat room as one of the chat participants or when a quiz question submission request is input by any one of the chat participants after the quizbot is added to the IMS chat room, and to display quiz information and advertisement information in the form of a chat message within the IMS chat room by using the quizbot when the quiz information and the advertisement information are received;
a quiz server configured to request the chat server to register the quizbot, receive the information of the chat participants from the chat server when the quizbot is added to the IMS chat room, transfer the information of the chat participants to a question pool server while requesting the question pool server to extract quiz information corresponding to the information of the chat participants, receive the extracted quiz information, transfer the information of the chat participants and the quiz information to an advertisement server when the quiz information is received from the question pool server while requesting the advertisement server to extract and transmit advertisement information corresponding to the information of the chat participants and the quiz information, and transfer the quiz information and the advertisement information to the chat server when the advertisement information is received;
the question server configured to register a plurality of quiz questions in a quiz question database, extract the quiz information corresponding to the information of the chat participants at a quiz information request of the quiz server, and transmit the extracted quiz information to the quiz server; and
the advertisement server configured to register a plurality of advertisements in an advertisement database, and extract and transmit the advertisement information corresponding to the information of the chat participants and the quiz information received from the quiz server at an advertisement information request of the quiz server, wherein the system operates in such a manner that:

the IMS chat room is created from the mobile terminal while adding the quizbot, or the IMS chat room is created from the mobile terminal by sequentially performing creation of the IMS chat room and addition of the quizbot to the IMS chat room as one of the chat participants, answers input by the chat participants from the mobile phone are displayed in the IMS chat room on the mobile phone, and a result of determination of whether the answers input into the IMS chat room are correct answers is input into the IMS chat room as a chat message by the quizbot.

23. The system according to claim 22, wherein the IMS chat room is a one-to-one chat room having only two participants in which one participant is a mobile terminal user and the other one is the quizbot or a group chat room having at least three participants in which one participant is a mobile terminal user, another participant is the quizbot, and the other participant is a person who is not specifically defined.

24. The system according to claim 22, wherein the chat server determines whether a chat message input by a certain chat participant of the chat participants of the IMS chat room from the respective mobile terminal contains a predetermined character, determines the chat message containing the predetermined character as an answer to the quiz, and transmits the chat message determined as the answer to the quiz server.

25. The system according to claim 24, wherein the quiz server determines whether the answer is correct and transmits a result of the determination to the chat server, the chat server commands the quizbot to input the result of the determination into the IMS chat room in the form of a chat message when the answer is correct, and the quizbot inputs a chat message into the IMS chat room to notify the chat participant who has submitted the answer which is correct, of an accrual of points for a user ID of the corresponding chat participant.

26. The system according to claim 22, wherein the quiz server commands the quizbot to input a chat message into the IMS chat room to give a hint for solving the quiz when no answer to the quiz is submitted, or when no correct answer is found among the answers input by a predetermined ratio or more of the chat participants, within a preset time limit starting from when the quiz is submitted by the quizbot.

27. The system according to claim 22, further comprising: a point management server configured to register points, in a point database, per chat participant of the chat participants registered in the chat server and to process an accrual/redemption of the points at an accrual/redemption request of the quiz server.

* * * * *